(12) United States Patent
Rowstron et al.

(10) Patent No.: US 8,499,222 B2
(45) Date of Patent: Jul. 30, 2013

(54) SUPPORTING DISTRIBUTED KEY-BASED PROCESSES

(75) Inventors: Antony Rowstron, Cambridge (GB); Paolo Costa, Cambridge (GB); Gregory Francis O'Shea, Cambridge (GB); Austin Donnelly, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 259 days.

(21) Appl. No.: 12/967,903

(22) Filed: Dec. 14, 2010

(65) Prior Publication Data

US 2012/0151292 A1    Jun. 14, 2012

(51) Int. Cl.
*H03M 13/00* (2006.01)

(52) U.S. Cl.
USPC ............... 714/776; 718/104; 718/105

(58) Field of Classification Search
USPC ............ 714/776; 718/104, 105; 709/223, 709/224
See application file for complete search history.

(56) References Cited

U.S. PATENT DOCUMENTS

| | | | |
|---|---|---|---|
| 7,124,180 B1 | 10/2006 | Ranous | |
| 7,650,331 B1 * | 1/2010 | Dean et al. | 712/203 |
| 8,112,758 B2 * | 2/2012 | Jain et al. | 718/104 |
| 2007/0038659 A1 | 2/2007 | Datar et al. | 707/101 |
| 2007/0143442 A1 | 6/2007 | Zhang et al. | |
| 2009/0006346 A1 * | 1/2009 | C N et al. | 707/4 |
| 2009/0313635 A1 * | 12/2009 | Dasdan | 718/105 |
| 2010/0180048 A1 | 7/2010 | Guo et al. | |
| 2010/0205588 A1 | 8/2010 | Yu et al. | |
| 2010/0226384 A1 | 9/2010 | Prabhakar et al. | |
| 2010/0241828 A1 | 9/2010 | Yu et al. | |
| 2011/0167149 A1 * | 7/2011 | Lee et al. | 709/224 |
| 2012/0182891 A1 * | 7/2012 | Lee et al. | 370/252 |

FOREIGN PATENT DOCUMENTS

WO    2009005594 A2    1/2009

OTHER PUBLICATIONS

"International Search Report", Mailed Date: Sep. 3, 2012, Application No. PCT/US2011/064752, Filed Date: Dec. 14, 2011, pp. 10.
Abd El Al, et al., "Bandwidth Aggregation in Stream Control Transmission Protocol", retrieved on Oct. 8, 2010 at <<http://ieeexplore.ieee.org/stamp/stamp.jsp?tp=&arnumber=1358667>>, IEEE Intl Symposium on Computers and Communications, vol. 2, Jun.-Jul. 2004, pp. 975-980.

(Continued)

*Primary Examiner* — Yolanda L Wilson
(74) *Attorney, Agent, or Firm* — Zete Law, P.L.L.C.; MacLane C. Key

(57) ABSTRACT

Supporting distributed key-based processes is described. In an embodiment, servers at a data center provide a key-based process for carrying out computationally expensive tasks and are connected using point to point connections in a geometric topology such as a torus. In an example, aggregation trees are built on top of the geometric topology of the data center, each aggregation tree being a sequence of servers in the data center that forms a tree structure. In an embodiment packets of data are sent from the leaves of the trees to the root and at each server along the tree the packets are aggregated using a combiner function of the key-based process. In an embodiment, if a server fails, the trees are dynamically recomputed and a recovery phase is triggered to resend any packets lost at the failed server. In some embodiments, packets are scheduled by inspecting the content of the packets.

20 Claims, 22 Drawing Sheets

OTHER PUBLICATIONS

Abu-Libdeh, et al., "Symbiotic Routing in Future Data Centers", retrieved on Oct. 8, 2010 at <<http://research.microsoft.com/en-us/um/people/aherbert/papers/sn/sn_10.pdf>>, ACM, Proceedings of SIGCOMM Conference on Data Communication, New Delhi, India, 2010, pp. 1-12.

Adiga, et al., "Blue Gene/L torus interconnection network", retrieved on Oct. 8, 2010 at <<http://citeseerx.ist.psu.edu/viewdoc/download?doi=10.1.1.139.744&rep=rep1&type=pdf>>, IBM Journal of Research and Development, vol. 49, No. 2-3, Mar. 2005, pp. 265-276.

Al-Fares, et al., "A Scalable, Commodity Data Center Network Architecture", retrieved on Oct. 8, 2010 at <<http://citeseerx.ist.psu.edu/viewdoc/download?doi=10.1.1.140.9669&rep=rep1&type=pdf>>, ACM, Proceedings of SIGCOMM Conference on Data Communication, Seattle, Washington, Aug. 2008, pp. 63-74.

Ananthanarayanan, et al., "Reining in the Outliers in Map-Reduce Clusters using Mantri", retrieved on Oct. 8, 2010 at <<http://research.microsoft.com/pubs/132199/mantri_tr_2010.pdf>>, Microsoft Research, Microsoft Corporation, Technical Report MSR-TR-2010-69, May 2010, pp. 1-24.

Condie, et al., "MapReduce Online", retrieved on Oct. 8, 2010 at <<http://www.usenix.org/event/nsdi10/tech/full_papers/condie.pdf>>, USENIX Symposium on Networked Systems Design and Implementation (NSDI), 2010, pp. 1-15.

Costa, et al., "Why Should We Integrate Services, Servers, and Networking in a Data Center?", retrieved on Oct. 8, 2010 at <<http://research.microsoft.com/en-us/um/people/antr/MS/wren.pdf>>, ACM, Proceedings of Intl Workshop on Research on Enterprise Networking (WREN), Barcelona, Spain, Aug. 2009, pp. 111-118.

Dean, et al., "MapReduce: A Flexible Data Processing Tool", retrieved on Oct. 8, 2010 at <<http://cs.smith.edu/dftwiki/images/0/0c/Communicaions201001-MapReduceFlexibleDataProcessingTool.pdf>>, Communications of the ACM, Jan. 2010, vol. 53, No. 1, pp. 72-77.

Dean, et al., "MapReduce: Simplified Data Processing on Large Clusters", retrieved on Oct. 8, 2010 at <<http://www.eecs.umich.edu/~klefevre/eecs584/Handouts/mapreduce.pdf>>, University of Michigan, EECS 594, powerpoint presentation, 2009, pp. 1-27.

Dean, et al., "MapReduce: Simplified Data Processing on Large Clusters", retrieved on Oct. 8, 2010 at <<http://citeseerx.ist.psu.edu/viewdoc/download?doi=10.1.1.120.7010&rep=rep1&type=pdf>>, ACM, Proceedings of Conference on Operating Systems Design and Implementation (OSDI), vol. 6, 2004, pp. 1-13.

Ghemawat, et al., "The Google File System", retrieved on Oct. 8, 2010 at <<http://citeseerx.ist.psu.edu/viewdoc/download?doi=10.1.1.125.789&rep=rep1&type=pdf>>, ACM, Proceedings of Symposium on Operating Systems Principles (SOSP), Bolton Landing, New York, Oct. 2003, pp. 29-43.

Greenberg, et al., "VL2: A Scalable and Flexible Data Center Network", retrieved on Oct. 8, 2010 at <<http://citeseerx.ist.psu.edu/viewdoc/download?doi=10.1.1.156.6990&rep=rep1&type=pdf>>, ACM, Proceedings of SIGCOMM Conference on Data Communication, Barcelona, Spain, Aug. 2009, pp. 1-12.

Gu, et al., "Sector and Sphere: The Design and Implementation of a High Performance Data Cloud", retrieved on Oct. 8, 2010 at <<http://arxiv.org/ftp/arxiv/papers/0809/0809.1181.pdf>>, Philosophical Transactions of the Royal Society, Crossing Boundaries: Computational Science, E-Science and Global E-Infrastructure, vol. 367, No. 1897, 2009, pp. 2429-2445.

Guo, et al., "BCube: A High Performance, Server-centric Network Architecture for Modular Data Centers", retrieved on Oct. 8, 2010 at <<http://citeseerx.ist.psu.edu/viewdoc/download?doi=10.1.1.160.4734&rep=rep1&type=pdf>>, ACM, Proceedings of SIGCOMM Conference on Data Communication, Barcelona, Spain, Aug. 2009, pp. 1-12.

Guo, et al., "DCell: A Scalable and Fault-Tolerant Network Structure for Data Centers", retrieved on Oct. 8, 2010 at <<http://citeseerx.ist.psu.edu/viewdoc/download?doi=10.1.1.168.5458&rep=rep1&type=pdf>>, ACM, Proceedings of SIGCOMM Conference on Data Communication, Seattle, Washington, Aug. 2008, pp. 75-86.

Gupta, et al., "Scalable Fault-Tolerant Aggregation in Large Process Groups", retrieved on Oct. 8, 2010 at <<http://citeseerx.ist.psu.edu/viewdoc/download?doi=10.1.1.25.5853&rep=rep1&type=pdf>>, Proceedings of Intl Conference on Dependable Systems and Networks (DSN), Goteborg, Sweden, 2001, pp. 433-442.

"Hadoop at Yahoo", retrieved on Oct. 8, 2010 at <<http://developer.yahoo.com/hadoop>>, Yahoo!, Inc., 2010, pp. 1.

Isard, et al., "Dryad: Distributed Data-Parallel Programs from Sequential Building Blocks", retrieved on Oct. 8, 2010 at <<http://citeseerx.ist.psu.edu/viewdoc/download?doi=10.1.1.70.3539&rep=rep1&type=pdf>>, ACM, European Conference on Computer Systems (EuroSys), Mar. 2007, Lisboa, Portugal, Mar. 2007, pp. 59-72.

Isard, et al., "Quincy: Fair Scheduling for Distributed Computing Clusters", retrieved on Oct. 8, 2010 at <<http://citeseerx.ist.psu.edu/viewdoc/download?doi=10.1.1.154.5498&rep=rep1&type=pdf>>, ACM, Proceedings of Symposium on Operating Systems Principles (SOSP), Big Sky, Montana, Nov. 2009, pp. 261-276.

Liu, et al., "Scheduling Algorithms for Multiprogramming in a Hard Real-Time Environment", retrieved on Oct. 8, 2010 at <<http://citeseerx.ist.psu.edu/viewdoc/download?doi=10.1.1.78.5086&rep=rep1&type=pdf>>, ACM Journal, vol. 20, No. I, Jan. 1973, pp. 46-61.

Madden, et al., "TAG: A Tiny Aggregation Service for Ad-Hoc Sensor Networks", retrieved on Oct. 8, 2010 at <<http://citeseerx.ist.psu.edu/viewdoc/download?doi=10.1.1.9.6306&rep=rep1&type=pdf>>, Proceedings of Symposium on Operating Systems Design and Implementation (OSDI), Boston, MA, vol. 36, No. SI, Dec. 2002, pp. 1-15.

Ratnasamy, et al., "A Scalable Content-Addressable Network", retrieved on Oct. 8, 2010 at <<http://citeseerx.ist.psu.edu/viewdoc/download?doi=10.1.1.76.7877&rep=rep1&type=pdf>>, ACM, Proceedings of SIGCOMM Conference on Applications, Technologies, Architectures, and Protocols for Computer Communications, San Diego, CA, Aug. 2001, pp. 1-13.

Rothenberg, et al., "Data center networking with in-packet Bloom filters", retrieved on Oct. 8, 2010 at <<http://www.dca.fee.unicamp.br/~chesteve/pubs/sibf-data-center-networking-ibf-esteve-sbrc2010.pdf>>, Simposio Brasileiro de Redes de Computadores e Sistemas Distribuidos (SBRC), Gramado, Brazil, May 2010, pp. 1-14.

Rowstron, et al., "CamCube: A novel data center", retrieved on Oct. 8, 2010 at <<http://trilogy-project.org/fileadmin/publications/Presentations/2010_07_02_Multipath_transport/rowston-camcube.pdf>>, Trilogy Workshop, powerpoint slides, Jul. 2010, pp. 1-26.

Vasudevan, et al., "Safe and Effective Fine-grained TCP Retransmissions for Datacenter Communication", retrieved on Oct. 8, 2010 at <<http://citeseerx.ist.psu.edu/viewdoc/download?doi=10.1.1.150.3384&rep=rep1&type=pdf>>, ACM, Proceedings of SIGCOMM Conference on Data Communication, Barcelona, Spain, Aug. 2009, pp. 1-12.

Weil, et al., "Ceph: A Scalable Object-Based Storage System", retrieved on Oct. 8, 2010 at <<http://citeseerx.ist.psu.edu/viewdoc/download?doi=10.1.1.78.9368&rep=rep1&type=pdf>>, University of California Santa Cruz, Storage Systems Research Center, Technical Report UCSC-SSRC-06-01, Mar. 2006, pp. 1-15.

Wu, et al., "MDCube: A High Performance Network Structure for Modular Data Center Interconnection", retrieved on Oct. 8, 2010 at <<http://citeseerx.ist.psu.edu/viewdoc/download?doi=10.1.1.163.7546&rep=rep1&type=pdf>>, ACM, Proceedings of Intl Conference on Emerging Networking Experiments and Technologies (CoNEXT), New York, NY, Dec. 2009, pp. 25-36.

Yalagandula, "SDIMS: A Scalable Distributed Information Management System", retrieved on Oct. 8, 2010 at <<http://citeseerx.ist.psu.edu/viewdoc/download?doi=10.1.1.114.4369&rep=rep1&type=pdf>>, University of Texas at Austin, Dissertation Proposal, Feb. 2004, pp. 1-35.

Yu, et al., "Distributed Aggregation for Data-Parallel Computing: Interfaces and Implementations", retrieved on Oct. 8, 2010 at <<http://citeseerx.ist.psu.edu/viewdoc/download?doi=10.1.1.154.4415&rep=rep1&type=pdf>>, ACM, Proceedings of Symposium on Operating Systems Principles (SOSP), New York, NY, 2009, pp. 247-260.

Yu, et al., "DryadLINQ: A System for General-Purpose Distributed Data-Parallel Computing Using a High-Level Language", retrieved on Oct. 8, 2010 at <<http://www.usenix.org/events/osdi08/tech/full_papers/yu_y/yu_y_html/>>, ACM, Proceedings of Symposium on Operating System Design and Implementation (OSDI), San Diego, CA, Dec. 2008, pp. 1-11.

Zaharia, et al., "Delay Scheduling: A Simple Technique for Achieving Locality and Fairness in Cluster Scheduling", retrieved on Oct. 8, 2010 at <<http://www.cs.berkeley.edu/~matei/papers/2010/eurosys_delay_scheduling.pdf>>, ACM, Proceedings of European Conference on Computer Systems (EuroSys), Paris, France, Apr. 2010, pp. 265-278.

Zaharia, et al., "Improving MapReduce Performance in Heterogeneous Environments", retrieved on Oct. 8, 2010 at <<http://www.usenix.org/event/osdi08/tech/full_papers/zaharia/zaharia_html/>>, ACM, Proceedings of Symposium on Operating Systems Design and Implementation (OSDI), San Diego, CA, Nov. 2008, pp. 29-42.

* cited by examiner

US 8,499,222 B2

SUPPORTING DISTRIBUTED KEY-BASED PROCESSES

BACKGROUND

Key-based processes are often used in data centers and other clusters or groups of computing entities where distributed processes are carried out.

Data centers and other clusters of computing entities are increasingly available and used to carry out computationally intensive processes, typically by distributing those processes over many computing entities in order to share the huge workload. For example, large input data sets may be processed at data centers by dividing the input data set between hundreds or thousands of servers at the data center so that each server may contribute to the task of processing the whole data set. In order to manage this division of labor effectively the huge data set is to be divided in an appropriate manner and the results of the processes at the individual servers need to be combined appropriately to give accurate results. One approach has been to use key-based processes which are processes for data-parallel computation which use key-value pairs. By using key-value pairs a framework for taking a task, breaking the task up into smaller tasks, distributing those to many computing entities for processing; and then combining the results to obtain the output is achieved. For example, in a process to count the frequency of each different word in a corpus of documents a key may be a word and a value may be an integer representing the frequency of that word in the corpus of documents. The keys may be used to enable intermediate results from the smaller tasks to be aggregated appropriately in order to obtain a final output.

Key-based processes for use with huge data sets distributed over hundreds or thousands of servers are increasingly being used as a data processing platform. These types of key-based processes typically comprise a map phase and a reduce phase. During the map phase each server applies a map function to local chunks of an input data set in parallel. A plurality of reducers work in parallel to combine results of the map phase to produce an output. During a reduce phase all outputs of the map phase that share the same key are presented to the same reducer.

There is an ongoing need to improve the speed, efficiency and accuracy of operation of these types of key-based processes on data centers or other clusters of computing entities.

The embodiments described below are not limited to implementations which solve any or all of the disadvantages of known systems and methods for supporting key-based processes.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Supporting distributed key-based processes is described. In an embodiment servers at a data center provide a distributed key-based process for carrying out computationally expensive tasks and are connected using point to point connections in a geometric topology such as a torus. In an example, aggregation trees are built on top of the physical topology, each aggregation tree being a sequence of servers in the data center that forms a tree structure. In an embodiment packets of data for a particular reduce function are sent from the leaves of the trees to the root and at each server along the tree the packets are aggregated using a combiner function of the key-based process. In an embodiment, if a server fails, the trees are dynamically recomputed and a recovery phase is triggered to resend any packets lost at the failed server. In some embodiments, packets are scheduled by inspecting the content of the packets.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in servers at a data center, the system described is provided as an example and not a limitation. As those skilled in the art will appreciate, the present examples are suitable for application in a variety of different types of networks or clusters of computing entities.

A key-based process may be any process with a map function that processes input data and produces an intermediate data set of (key, value) pairs, and a reduce function that combines the set of (key, value) pairs with the same key, to produce an output. A non-exhaustive list of examples of suitable key-based processes is: MapReduce (trade mark), Hadoop (trade mark), Dryad (trade mark) and DryadLINQ (trade mark).

Figure 1:
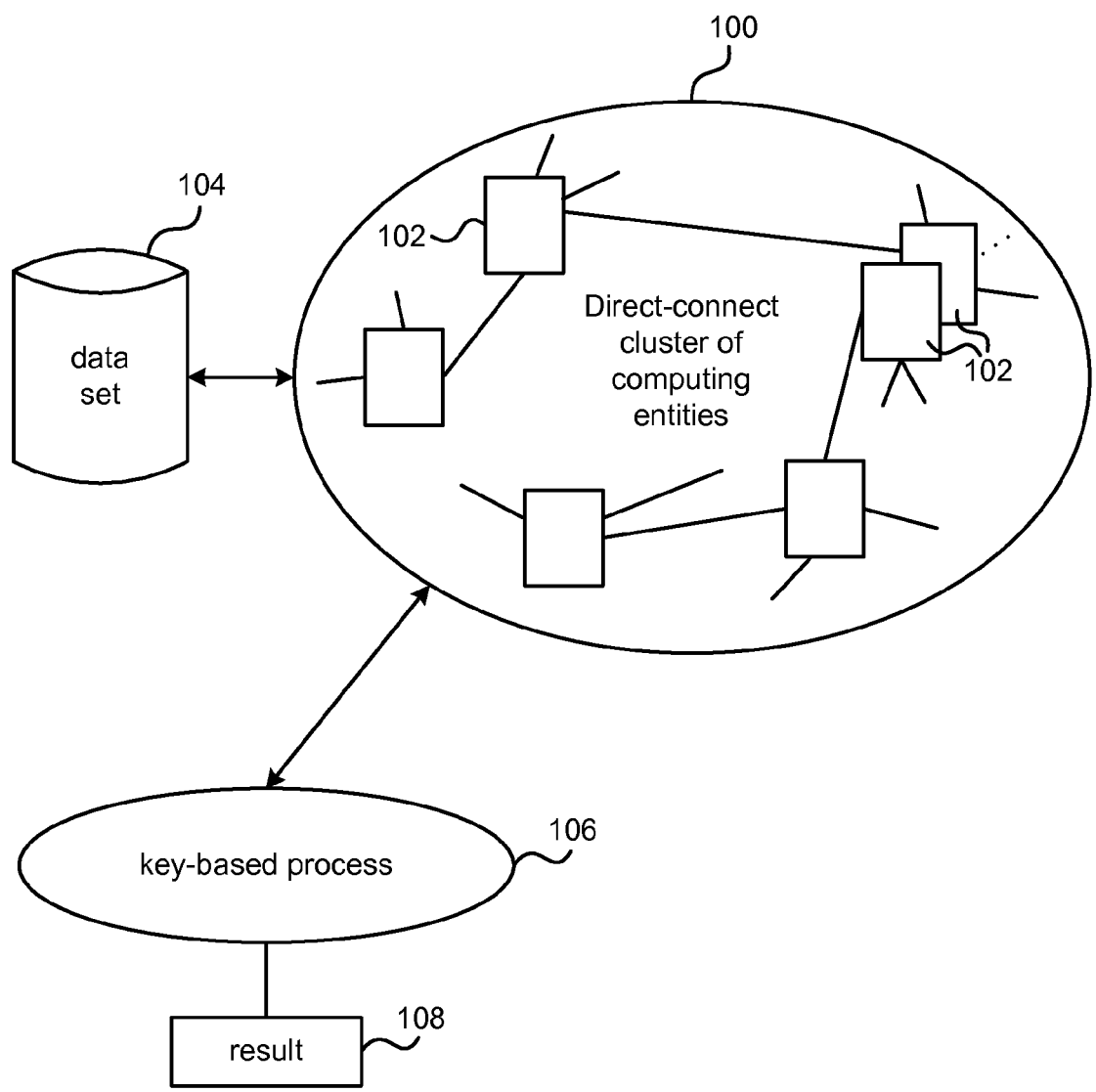
FIG. 1 is a schematic diagram of a direct-connect cluster of computing entities which provides a key-based process.

FIG. 1 is a schematic diagram of a cluster 100 of computing entities 102 such as servers at a data center, or any other type of computing entities which are connected to one another by communications links. The cluster has a direct-connect topology. That is, each computing entity has point to point connections to other computing entities in the network; no routers or switches are present. The cluster may have hundreds or thousands of computing entities or more. In order to carry out a computationally intensive task such as counting the frequency of words in a huge corpus of documents, sorting data, extracting user preferences from click-through traces, log analysis, executing queries in a search engine, or other tasks where huge amounts of data are to be processed, the cluster 100 uses a key-based process 106. The key-based process enables the task to be broken down into many smaller tasks which in turn may be broken down into smaller tasks and so on. The smaller tasks are carried out in parallel at the computing entities 102 each of which is works on a small part of the data set 104 and the results are combined or aggregated using the key-based process to produce a result 108. In this way the cluster 100 of computing entities is able to share the workload of the huge task amongst its computing entities. The key-based process is distributed amongst the computing entities in the cluster 100.

Figure 2:
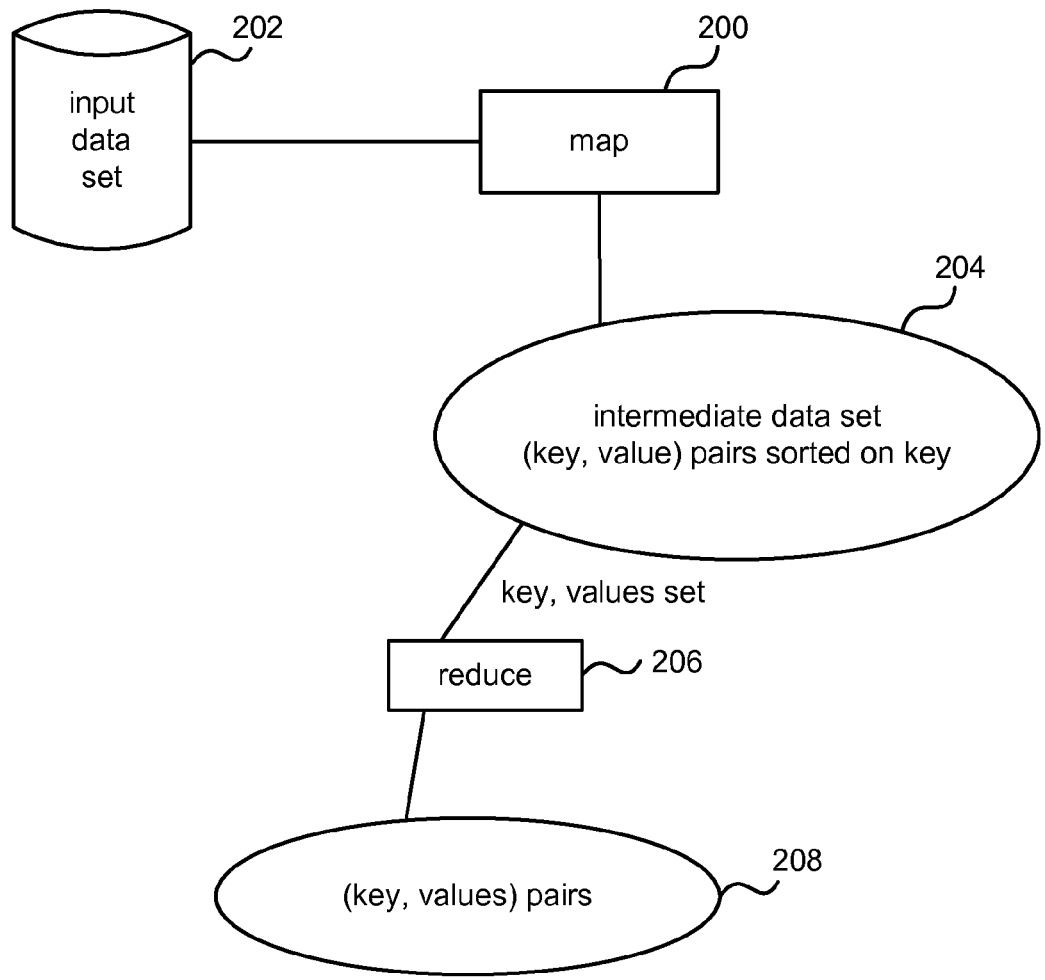
FIG. 2 is a schematic diagram of a key-based process.

The key-based process may be of any suitable type which comprises a map phase and a reduce phase. For example, as explained with reference to FIG. 2 an input data set 202 (e.g. a corpus of documents) is mapped using a map function 200 into an intermediate data set 204. The intermediate data set comprises key, value pairs which are usually sorted by key. In the example of the corpus of documents, the keys may be words and the values may be the frequency of the words in a line of a document. There may be a plurality of map components at each computing entity in the cluster 100 and these components may operate in parallel over the cluster to map the data. A plurality of reduce components at computing entities in the cluster receive the intermediate data and combine the key, value pairs to produce a set of output key values pair 208. For example, a reduce task may receive all key, value pairs where the key is the word "a" and then add the values of those pairs in order to obtain the frequency of the word "a" in the corpus of documents.

Figure 3:
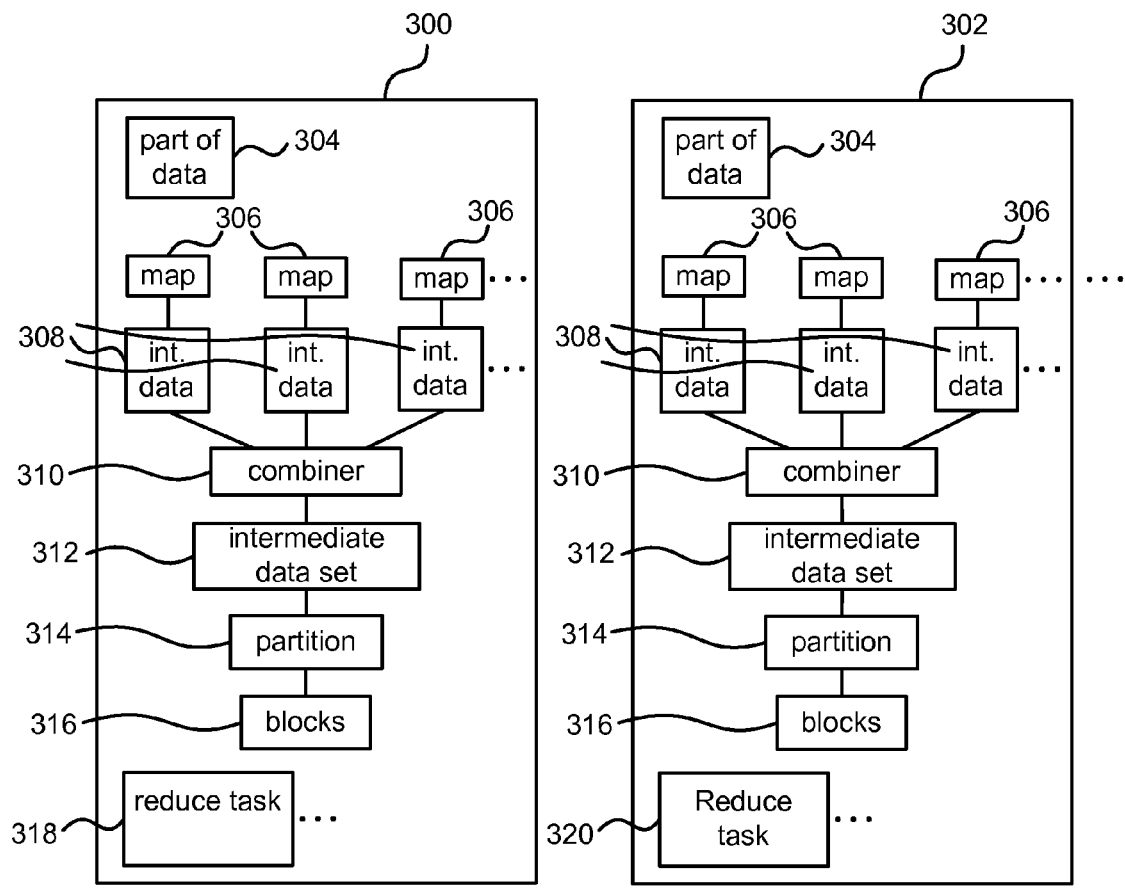
FIG. 3 is a schematic diagram of a plurality of computing entities each arranged to provide a key-based process.
Figure 4:
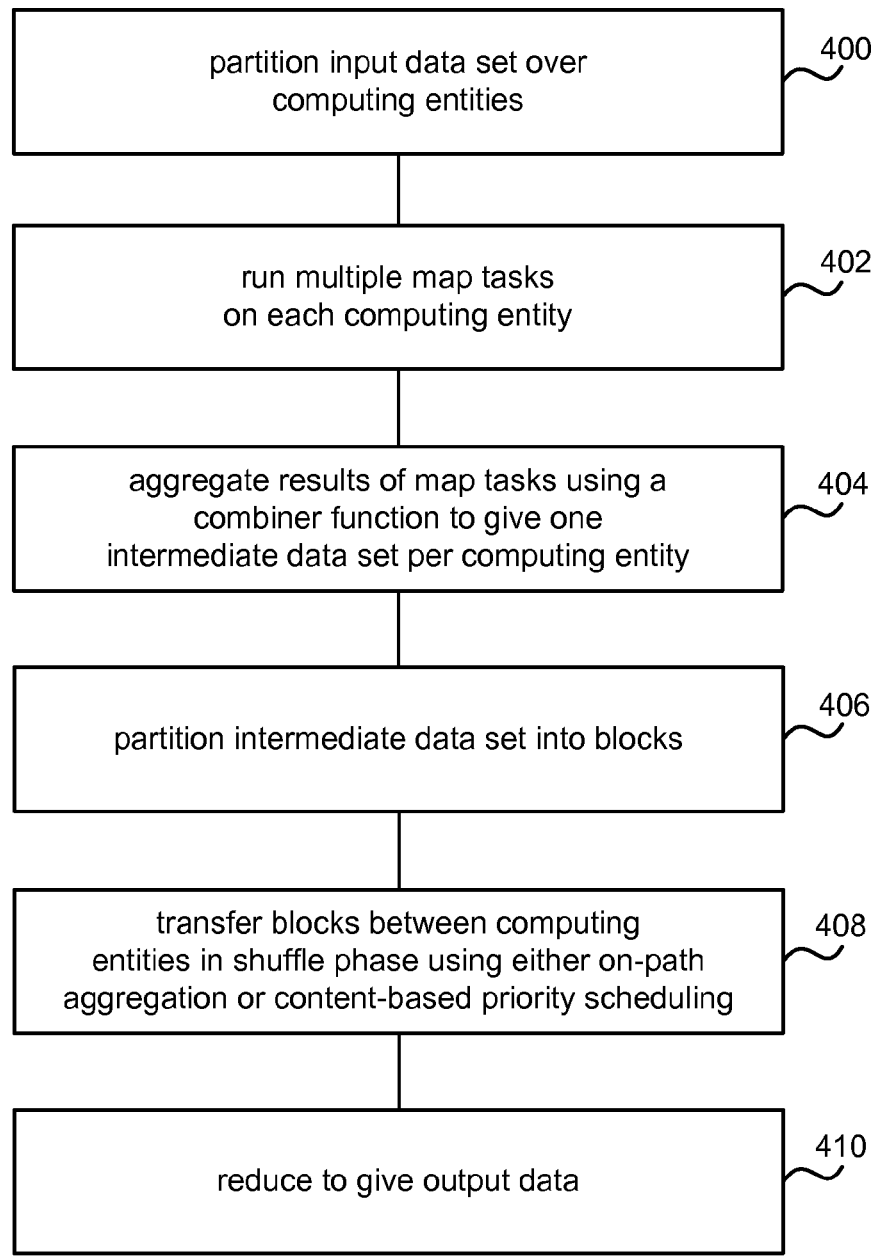
FIG. 4 is a flow diagram of an example key-based process.

FIG. 3 is a schematic diagram of a plurality of computing entities 300 of the cluster 100 of FIG. 1. Each computing entity stores part of the input data 304. It comprises a plurality of map components 306 arranged to map the locally stored part of the input data into intermediate data 308 in the form of key, value pairs. The locally produced intermediate data 308 may be combined by a combiner component 310 at the computing entity to form a combined intermediate data set 312. This is then partitioned using a partition component 314 into blocks 316 where each block is destined for a particular reduce task. That is, each reduce task is arranged to operate on a specified range of keys. If the reduce task for a particular block is at the local computing entity it is provided to that local reduce task. Otherwise the block is sent over the cluster to the appropriate reduce task located elsewhere in the cluster. For example, in FIG. 3 a reduce task 318 for a range of keys is local to one of the computing entities. Another reduce task 320 for a range of keys is local to the other computing entity. During the shuffle phase, when blocks are sent over the cluster to the appropriate reduce tasks, benefits may be achieved as described below by using either on-path aggregation or by using particular types of scheduling scheme. For example, where the reduce task is associative and commutative, on-path aggregation may be used to achieve performance benefits as described later in this document. In other examples, where the reduce task is not associative and commutative, scheduling schemes may be used to achieve performance benefits at least in the shuffle phase.

In an example of a key-based process an input data set is partitioned 400 over computing entities in a data center or other cluster. A plurality of map tasks are run 402 on each computing entity in the data center to map the partitioned data in to key, value pairs. This is referred to as a map phase. The results of the map tasks are aggregated 404 using a combine function to give one intermediate data set per computing entity. The intermediate data set is then partitioned 406 into blocks and the blocks are transferred 408 between the computing entities in a shuffle phase. During this shuffle phase either on-path aggregation or content-based priority scheduling may be used as described in more detail below. In existing data centers the shuffle phase uses an all to all traffic pattern which can saturate the network and lead to performance decrease. During the shuffle phase blocks are transferred to the appropriate reduce task. Each reduce task can be thought of as having a stream or flow of blocks traveling over the cluster towards it. During a reduce phase, the reduce tasks combine the set of all key, value pairs with the same key to produce an output 410. The shuffle phase is difficult to deal with in many existing data centers because these have difficulty supporting the all-to-all traffic pattern. Existing data centers (which don't use direct-connect topology server clusters) typically have a high bandwidth oversubscription and experience in-cast problems. Bandwidth oversubscription means the bisection bandwidth of the data center is low, so the rate of data transfer during the shuffle phase is constrained. In addition, the all-to-all traffic pattern requires a number of flows which is on the order of the square of the number of servers. This large number of flows, combined with the small buffers on commodity top-of-rack switches results in TCP throughput collapsing as buffers are overrun. This is known as the incast problem. By using a direct-connect topology network and schemes such as content-based priority scheduling or on-path aggregation as described below benefits are achieved especially in the shuffle phase. More detail is now given about content-based priority scheduling.

In some embodiments a reduce task can only start when it has received all (key, value) pairs associated with a particular key; it can then perform a reduce function on that key, while still receiving later packets from the stream (for other keys). In some embodiments a transport protocol is implemented at the computing entities in the cluster which seeks to maximize the time that each reduce task has a set of keys available to process. This maximizes concurrency between the shuffle phase and reduce phase in order to decrease the total job execution time.

Figure 5:
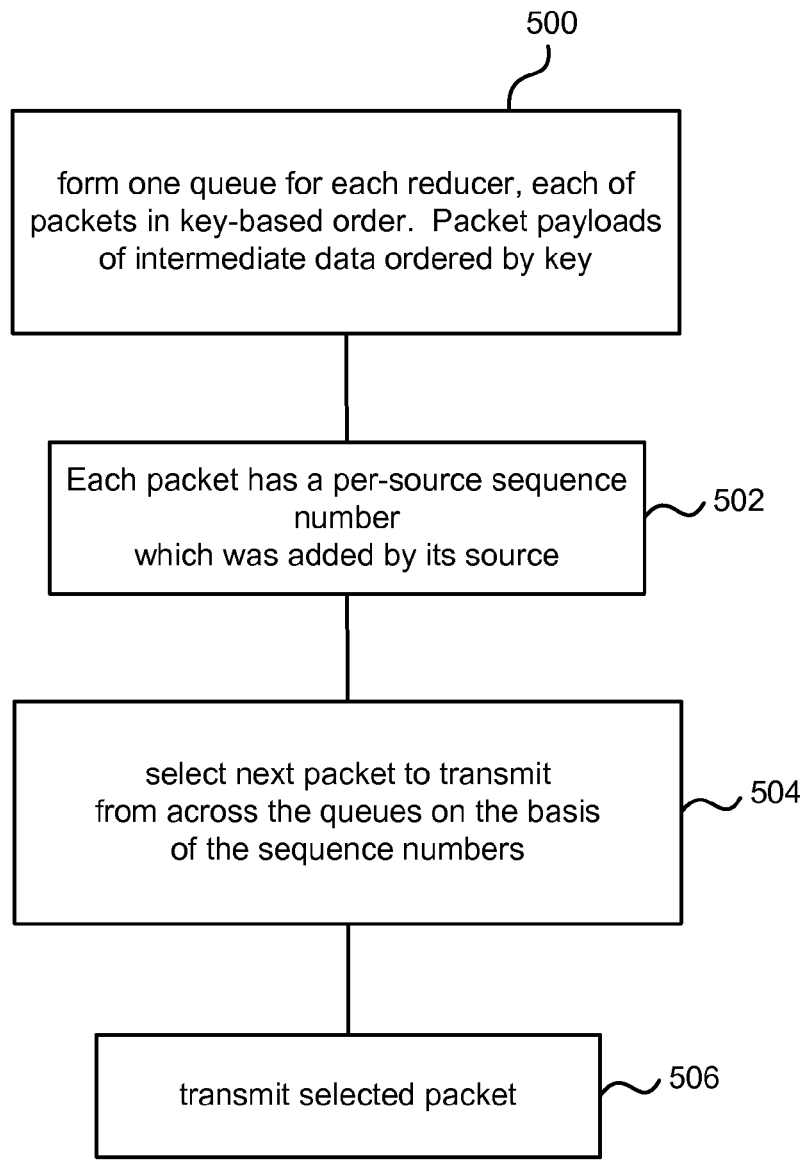
FIG. 5 is a flow diagram of a method at a computing entity for transmitting a packet of key-based data.

For example, each computing entity forms a separate queue for each reduce task where each reduce task is assigned a different range of the key space (e.g. words beginning with a-e). Packets that have payloads of intermediate data, in the form of key, value pairs, are added to these queues in order to be forwarded to the appropriate reduce tasks in the shuffle phase. In order to select the next packet for transmission from across the multiple queues maintained, a per-stream sequence number may be embedded in each packet by the packet source. The set of packet queues are ordered on the sequence number of the packet at the head of queue. For example, the packet with the lowest sequence number is transmitted first. If there are several packets with the same sequence number one may be chosen randomly. With reference to FIG. 5, one queue is formed 500 for each reducer with each queue being of packets in key-based order such that the order of the packets in each queue is related to the order of the keys in the payloads of those packets. The payloads of the packets are of intermediate data ordered by key. A per-source sequence number has been added 502 to each packet by the ultimate source of that packet (rather than an intermediate source in a multi-hop scenario). The next packet to transmit is selected 504 from across the queues on the basis of the sequence numbers. The selected packet is then transmitted 506.

Figure 6:
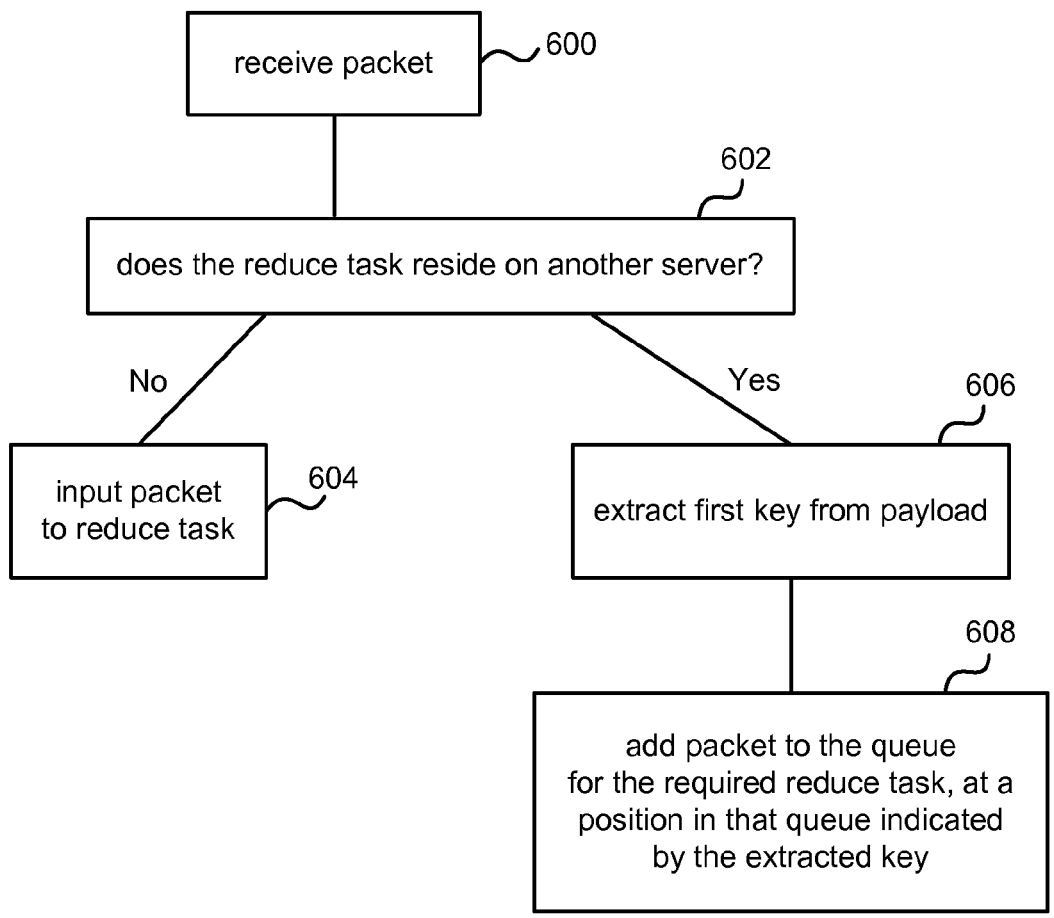
FIG. 6 is a flow diagram of a method at a computing entity for content-based priority scheduling.

An example method of forming the queues of packets in key-based order is now described with reference to FIG. 6.

When a computing entity receives 600 a packet in the shuffle phase it checks 602 whether the reduce task for the intermediate data in the payload of the packet resides on another server. If not the packet is input 604 to a local reduce task at the computing entity. Otherwise the transport protocol extracts 606 the first key from the payload of the packet. It then adds 608 the packet to the queue for the required reduce task at a position in the queue indicated by the extracted key. Because the intermediate data in the payload is in key-based order the first key extracted is a good indicator of where in the queue to put the packet. This helps to maximize the time that each reduce task has a set of keys available to process.

Examples which use on-path aggregation are now described.

Figure 7:
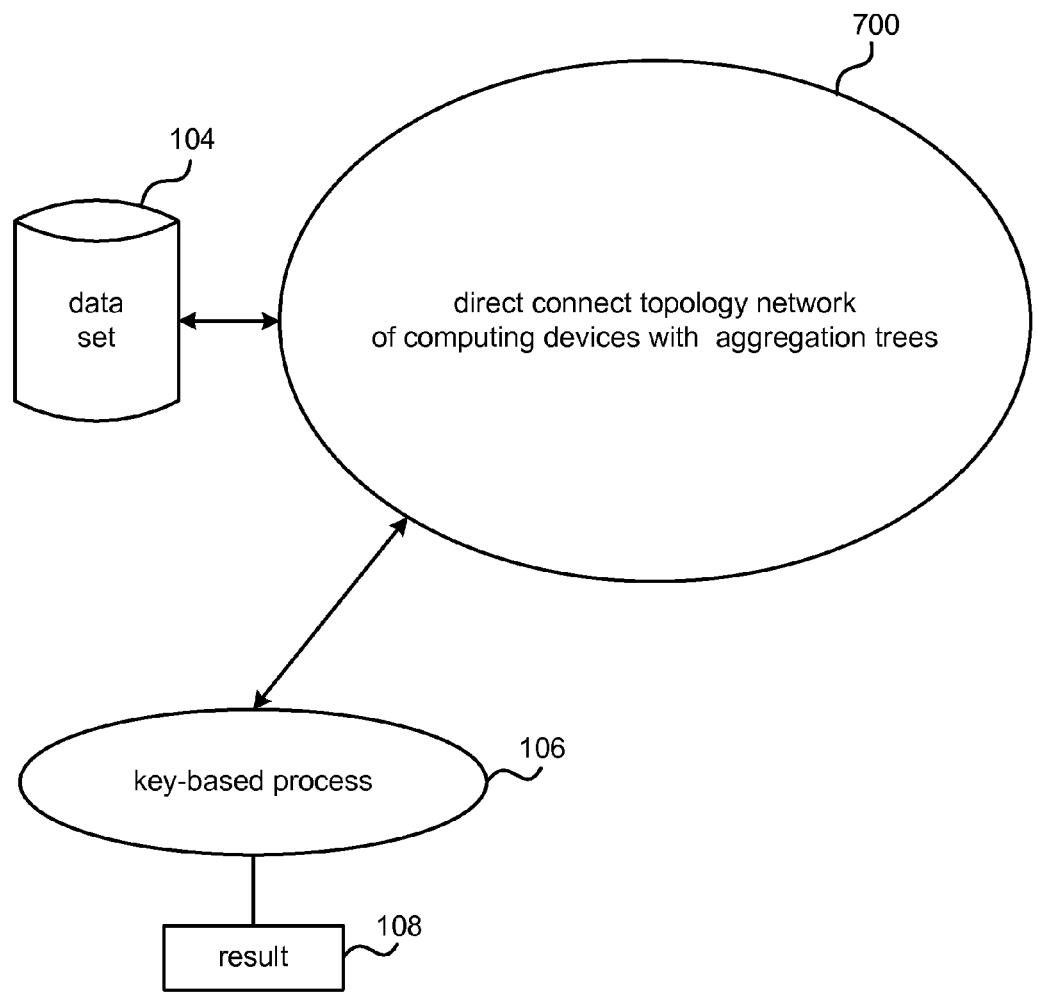
FIG. 7 is a schematic diagram of a direct connect topology network with aggregation trees used for a key-based process.

FIG. 7 shows a direct connect topology network 700 of computing entities such as servers at a data center or other clusters of computing entities. The network has a topology which supports aggregation trees in beneficial ways such as by enabling edge-independent aggregation trees to be provided as described below. There may be hundreds or thousands of computing entities in the network. Because the topology is direct connect, each computing entity has point to point connections to other computing entities in the network; that is, no routers or switches are present. These point to point connections may be of any suitable type such as Ethernet connections, USB cables, LightPeak (trade mark), Fibre Channel (trade mark), Myrinet (trade mark), Infiniband (trade mark), SCSI, SATA, SAS, SONET/SDH. Any point to point, serial or block interconnect that offers high speed and electrical isolation may be used. In some embodiments the topology of the network is a geometric topology over which a plurality of edge-independent aggregation trees may be defined. A non-exhaustive list of examples of suitable topologies which enable edge-independent trees is: a three dimensional torus (also referred to as a k-ary 3-cube), a two dimensional torus, a torus of higher dimension than three and a De Bruijn graph. A k-ary 3-cube is a three dimensional cube topology with k computing entities along each axis, each computing entity being directly connected to each of six neighbors. In some embodiments each aggregation tree comprises every node in the direct-connect network in order to load balance optimally. However, this is not essential.

The network 700 supports a distributed key-based process 106 as described above which operates on a huge data set 104 to produce a result 108. By using a direct-connect network benefits are achieved. For example, bottlenecks which typically occur at switches and routers are avoided and performance benefits especially in the shuffle phase are found.

Figure 8:
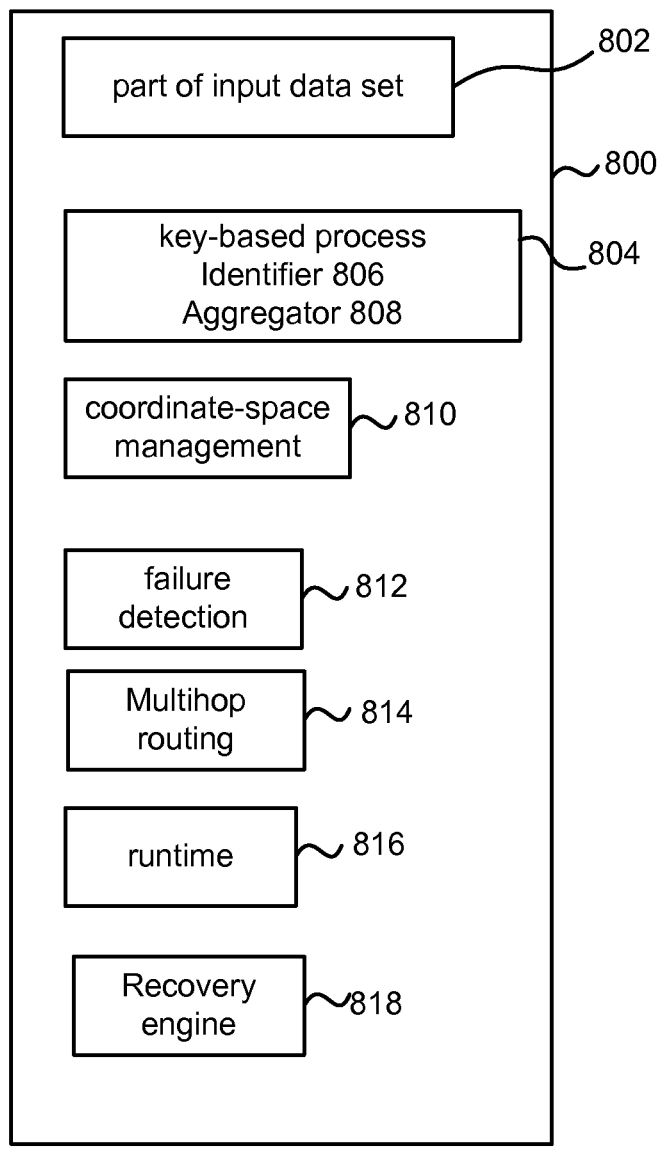
FIG. 8 is a schematic diagram of a computing device for use in a direct connect topology network.

An example computing entity at the network 700 is illustrated in FIG. 8. It comprises at least a memory 802 storing part of the input data set, a key-based process 804 for working on the input data set, a co-ordinate space management component 810, a failure detection component 812 arranged to detect failures in links at the computing entity, a multi-hop routing component 814, a runtime 816, a recovery engine 818 and other components as required for a computing entity. Each of the components 804-814 in FIG. 8 may be referred to as a service. The runtime 816 provides mechanisms to allow the services to access other services on the same computing entity. Some of the services may be continually running such as the co-ordinate space management, and failure detection.

The part of the input data set at the computing entity may be provided in any suitable manner. For example, using a distributed file system. The data may be split into multiple files containing multiple records and pre-inserted into the distributed file system. A unique key may identify a file and determine the set of servers that will store a file replica. Alternatively, the data records may be stored in a structured or semi-structured storage system, for example a database or key-value store, avoiding the direct use of files.

The co-ordinate space management component 810 is arranged to create and maintain a co-ordinate space which is mapped onto the servers or other computing entities in the network. In an example, the network topology is a 3D torus and the unique address of a server is a 3D co-ordinate. If a computing entity in the network fails then the co-ordinate for that computing entity is dynamically re-assigned to another node. This may be achieved by arranging the co-ordinate space management system to dynamically adjust the co-ordinate space such that the failed entity is bypassed.

For example, each server has a unique identifier, which represents its location in the physical topology, and in the one example this takes the form of a 3-D coordinate. The coordinate may be assigned by a bootstrap protocol that is run when the data center is commissioned. The bootstrap protocol, as well as assigning identifiers of the form (x; y; z), may also detect wiring inconsistencies. This bootstrap protocol reduces the need for manually checking and configuring a data center which is expensive, and automating the process is beneficial, especially as data centers move towards using sealed storage containers.

In an example, the bootstrap protocol achieves this by selecting a random node to be the conceptual origin (0; 0; 0), and uses a decentralized algorithm to determine each server's location, exploiting a priori knowledge of the topology. This works in the presence of link and server failures, as well as with wiring inconsistencies.

The key-based process 804 may be arranged to receive job descriptions comprising for example, the code for map, reduce and any other functions required such as combiner and partition functions. It may also receive a description of the input data and any operator configurable parameters. In an example, when the computing entity 800 receives a job request it is broadcast to all the computing entities in the cluster. In general, when a computing entity receives the broadcast request it determines if for any of the input data it is the primary replica, and if so, initiates a map task to process the local file. This enables map tasks to read local data rather than using network resources to transfer blocks. However, any server may run a map job on any file, even though it is not storing a replica of the file. This enables failures or stragglers to be handled.

The key-based process 804 may in some embodiments comprise an identifier 806 and an aggregator 808. These components provide functionality to implement aggregation trees as described below. For example, the identifier may be arranged to identify streams of packets to be aggregated and the aggregator may perform the aggregation of packets on the identified streams.

The runtime 816 enables packets to be sent and received on each of the direct-connect links at the computing entity. Any suitable packet format may be used. In an example, packets use a header format having a single service identifier field. The runtime 816 on each server uses this to demultiplex the packet to the correct service. Services can include their own additional headers in the packet, as required. In order to allow the runtime to manage the outbound links, each service maintains an outbound packet queue. Services are polled, in turn, by the runtime for packets to be sent on each of the outbound links when there is capacity on the link.

This means that in some examples there is explicit per-link congestion control; if a link is at capacity then a service will not be polled for packets for that link. A service is able to control the link queue sizes, decide when to drop packets, and also to dynamically select the link to send a packet out on if there are potentially several links on which it could be forwarded. By default the runtime provides a fair queuing mechanism, meaning that each service is polled at the same frequency, and ifs services wish to send packets on the same link then each will get 1/s fraction of the link bandwidth.

In some embodiments on-path aggregation is used to give significant performance benefits. This involves combining at least some of the intermediate data as it is passed to the reduce tasks during the shuffle phase. This reduces congestion in the shuffle phase and distributes work load more evenly.

For example, a computing entity in the cluster may identify a plurality of streams of packets it receives for forwarding to a single reduce task of the key-based process at another entity in the network, those packets having payloads of intermediate data of the key-based distributed process. It is then able to aggregate a plurality of the packets from the identified streams to form a single packet and forward the single packet to the single reduce task. For example, aggregating the plurality of packets comprises aggregating intermediate data of payloads of the plurality of packets using a combiner function of the key-based distributed process.

In order to identify the packets to be aggregated one or more aggregation trees may be used. An aggregation tree is a sequence of computing entities in the cluster which has a tree-structure. The root of the tree is a computing entity which has a reduce task and the leaves and other vertices of the tree are computing entities which may have intermediate data to send to the reduce task. Packets of intermediate data may be passed from the leaves of the tree to the root and on-path aggregation may occur at each vertex of the tree during this process. A node receives packets from child nodes of a particular tree and knows to aggregate those packets. It then forwards the aggregated packet to the parent of that particular tree.

In order to provide improved load balancing during the shuffle phase when on-path aggregation occurs a plurality of aggregation trees per-reduce task may be used with the roots of each tree being at the same communications entity or node of the network. The aggregation trees may be edge-independent (or disjoint) so that any point to point communications link between two communications entities in the network is not a member of two aggregation trees. This gives load balancing benefits. In the case that multiple aggregation trees are used, the topology of the cluster or network may be selected so that all nodes are a member of each tree. This further enhances load balancing but is not essential.

Figure 9:
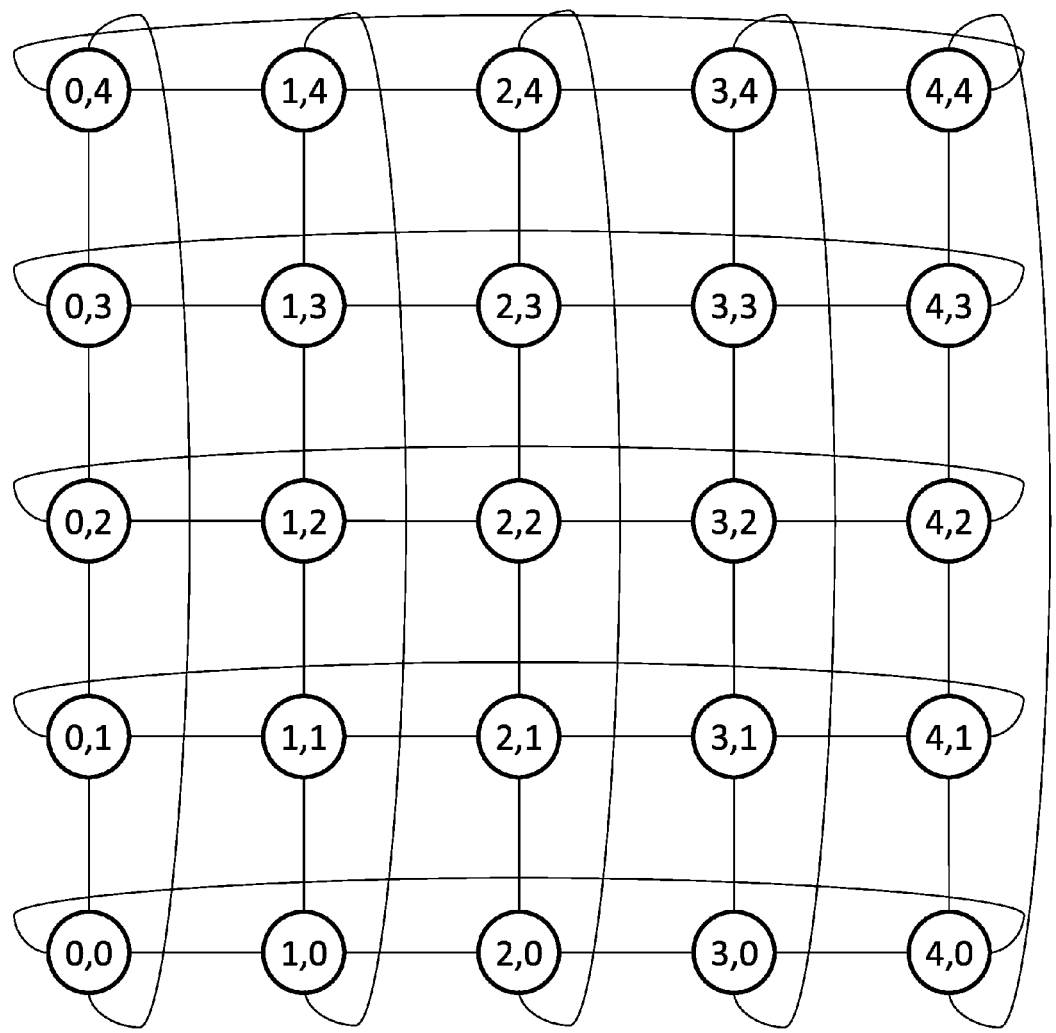
FIG. 9 is a schematic diagram of a direct connect topology network with a two dimensional topology.
Figure 10:
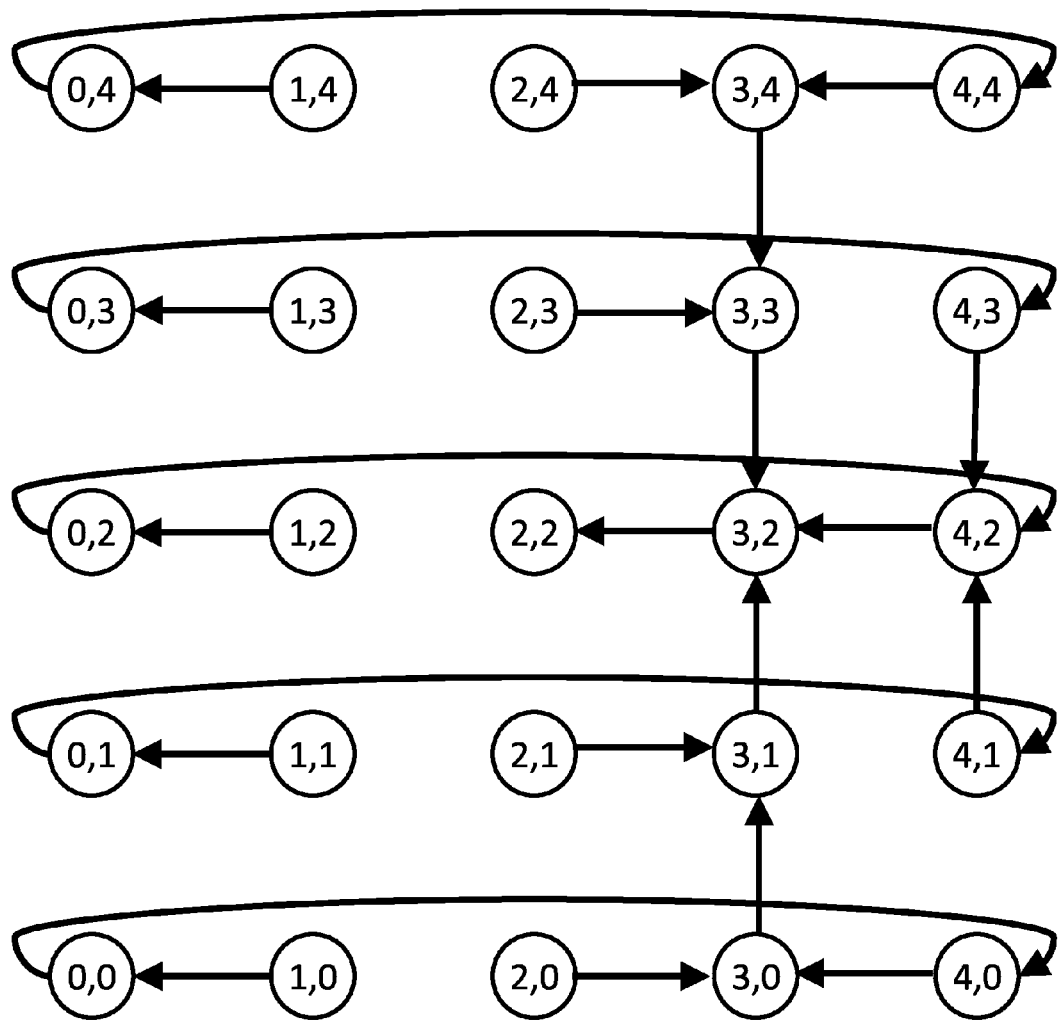
FIG. 10 is a schematic diagram of the network of FIG. 9 with a first aggregation tree defined over the network.
Figure 11:
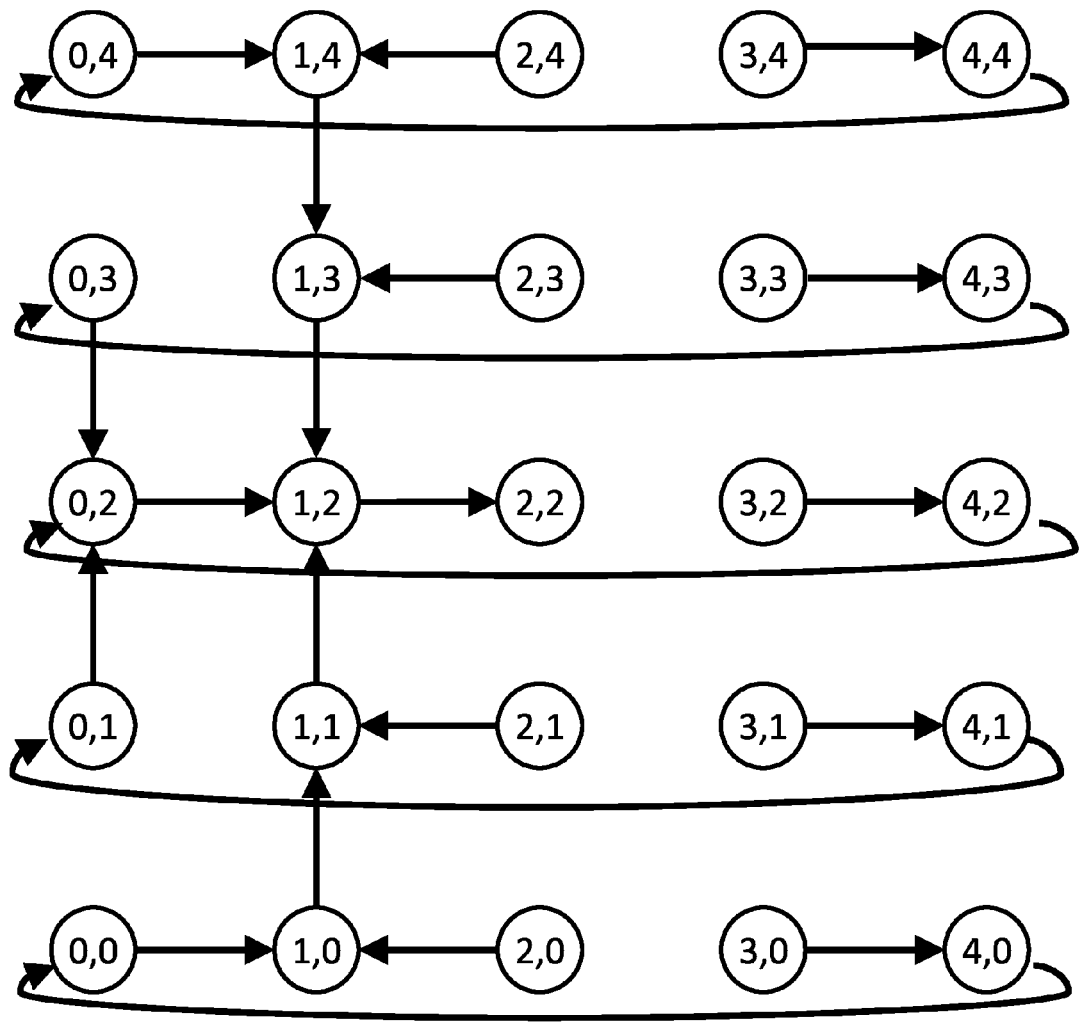
FIG. 11 is a schematic diagram of the network of FIG. 9 with a second aggregation tree defined over the network.
Figure 12:
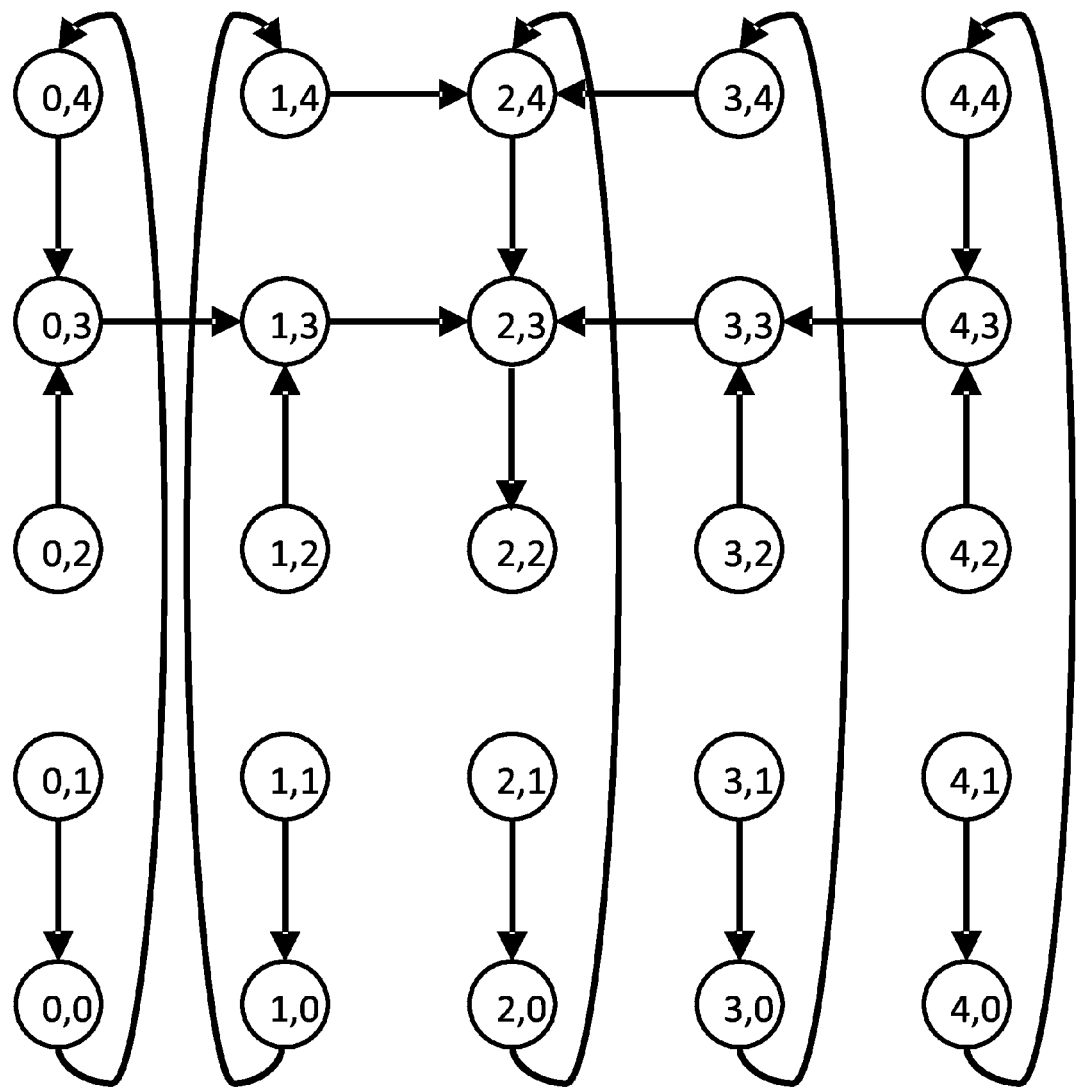
FIG. 12 is a schematic diagram of the network of FIG. 9 with a third aggregation tree defined over the network.
Figure 13:
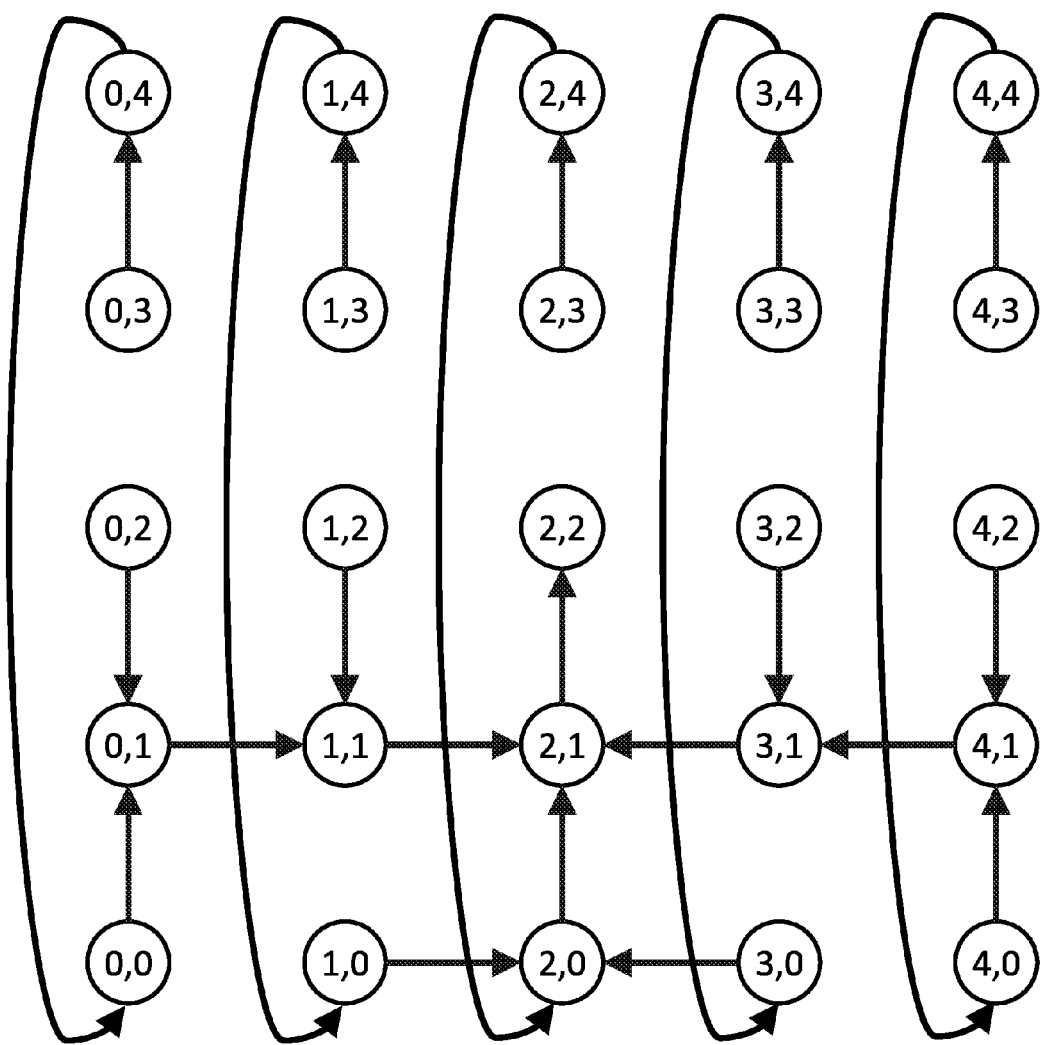
FIG. 13 is a schematic diagram of the network of FIG. 9 with a fourth aggregation tree defined over the network.

An example of a 2D, 5-ary network topology is given in FIG. 9. Here each node (computing entity) is represented by a circle containing its 2D co-ordinate. Each node has four point to point connections to other nodes. This topology may be extended for larger numbers of nodes in each dimension and it supports four, edge-independent aggregation trees. These are illustrated in FIGS. 10 to 13. The node with coordinates 2,2 is the root of each tree and in this example four aggregation trees are used per reduce task. Sets of four trees may be layered on top of each other to give as many reduce tasks as required. This network may be scaled up for larger numbers of nodes by increasing the number of nodes in each dimension. For example, it could be scaled to a 2D 100-ary network topology. Wiring layouts are known that may be achieved using short cables thus reducing costs.

Figure 14:
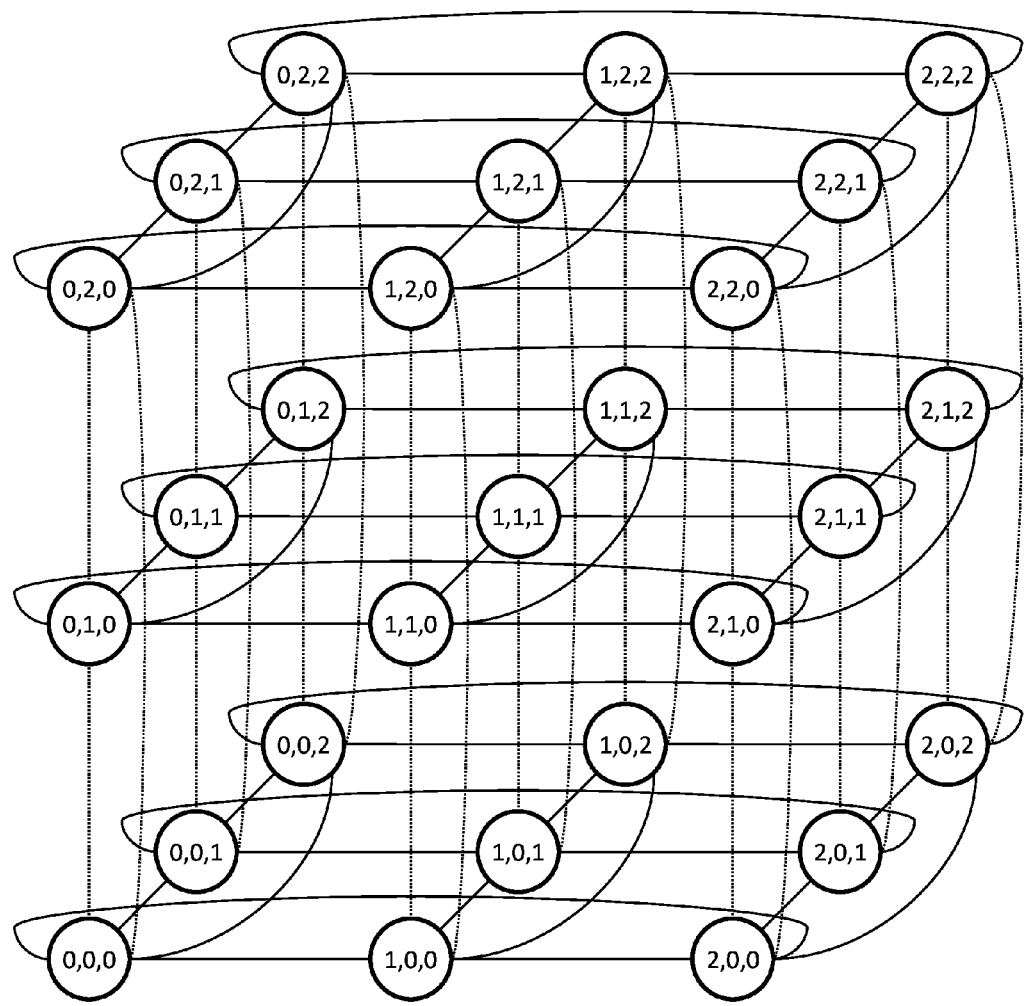
FIG. 14 is a schematic diagram of a direct connect topology network with a three dimensional topology.
Figure 15:
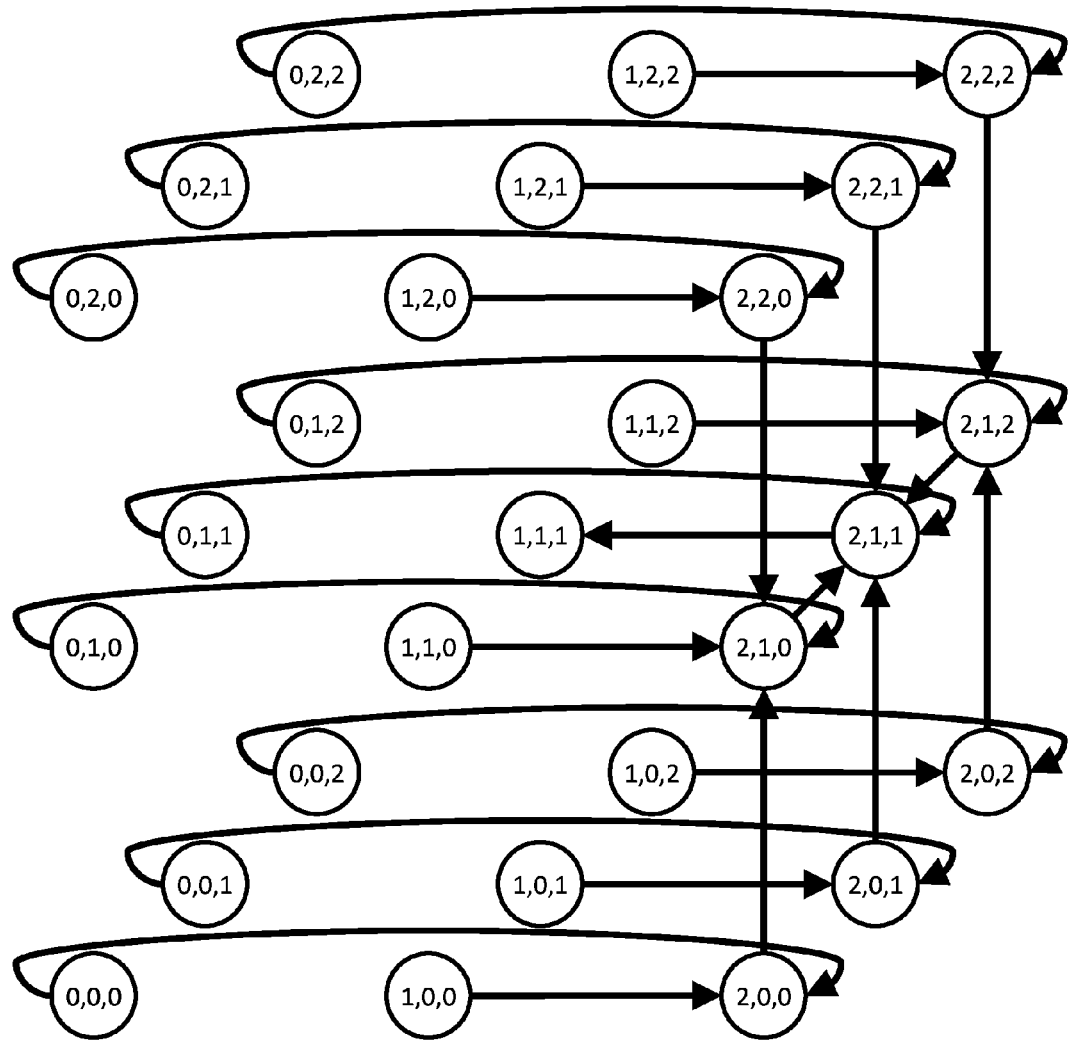
FIG. 15 is a schematic diagram of the network of FIG. 14 with a first aggregation tree defined over the network.
Figure 16:
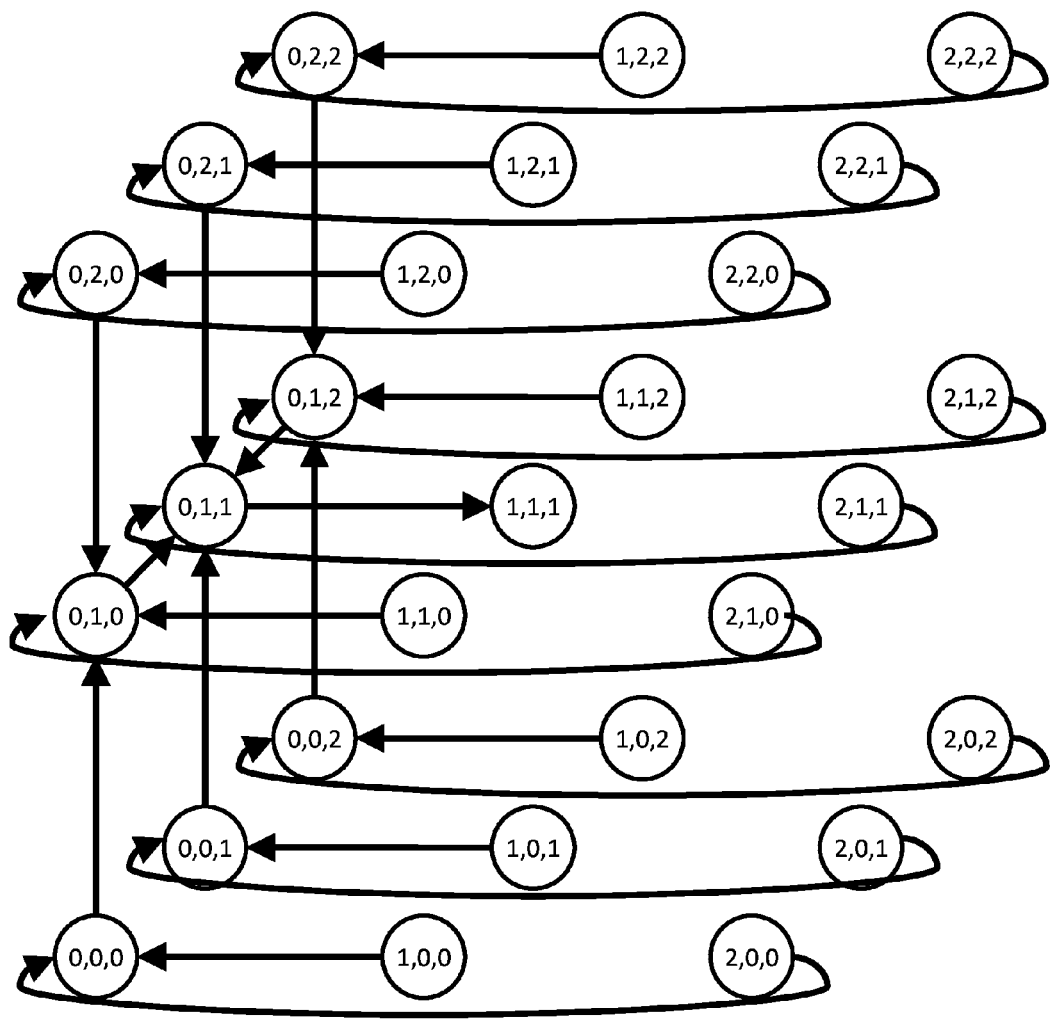
FIG. 16 is a schematic diagram of the network of FIG. 14 with a second aggregation tree defined over the network.
Figure 17:
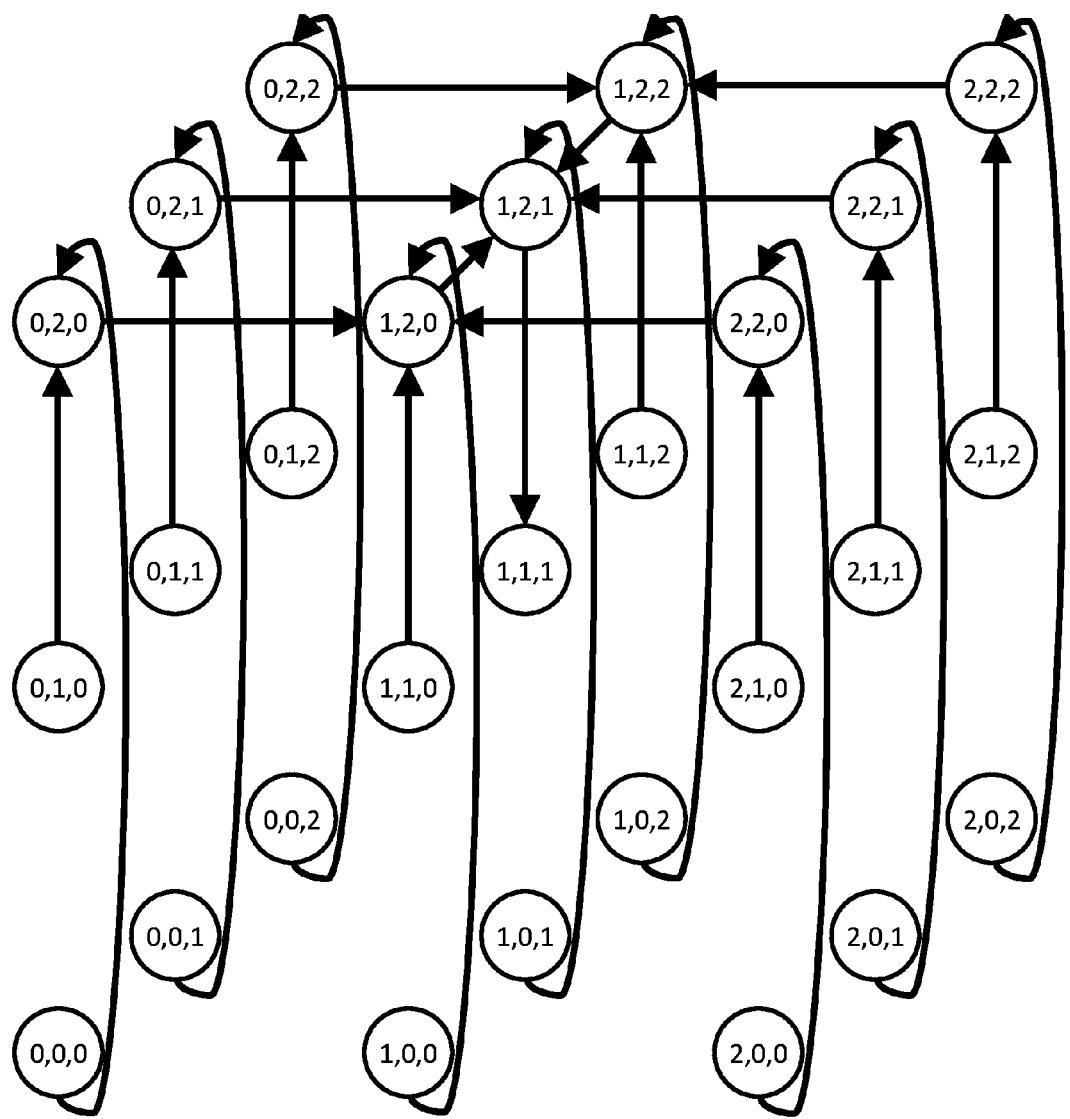
FIG. 17 is a schematic diagram of the network of FIG. 14 with a third aggregation tree defined over the network.
Figure 18:
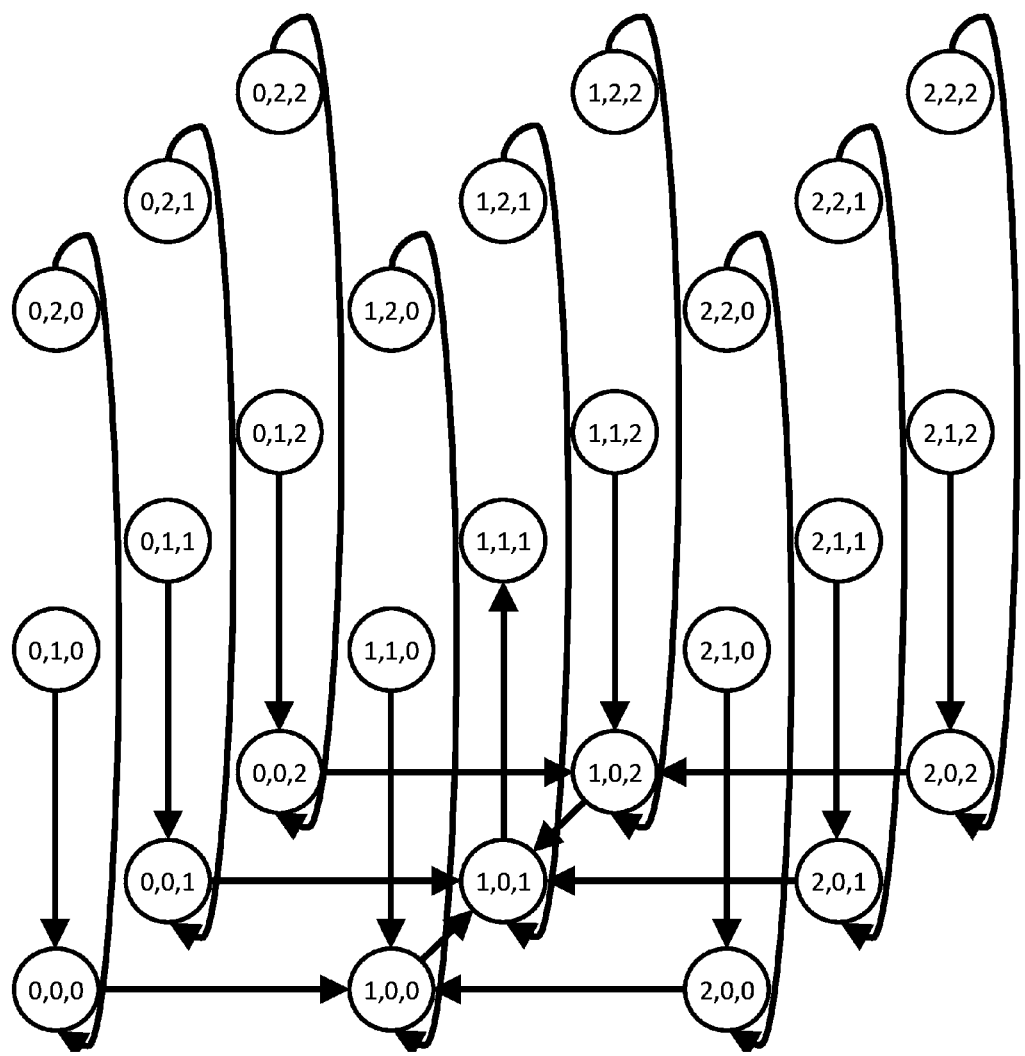
FIG. 18 is a schematic diagram of the network of FIG. 14 with a fourth aggregation tree defined over the network.
Figure 19:
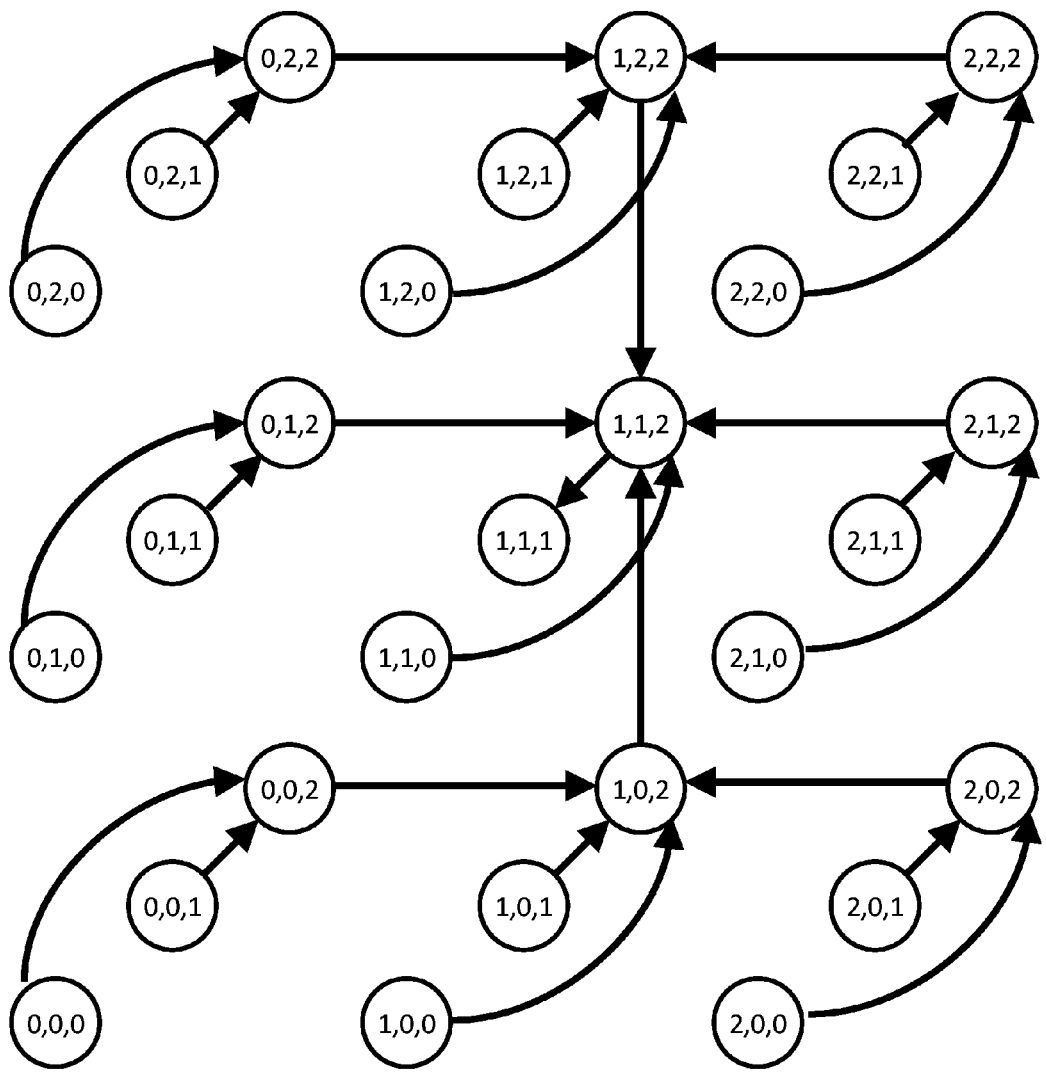
FIG. 19 is a schematic diagram of the network of FIG. 14 with a fifth aggregation tree defined over the network.
Figure 20:
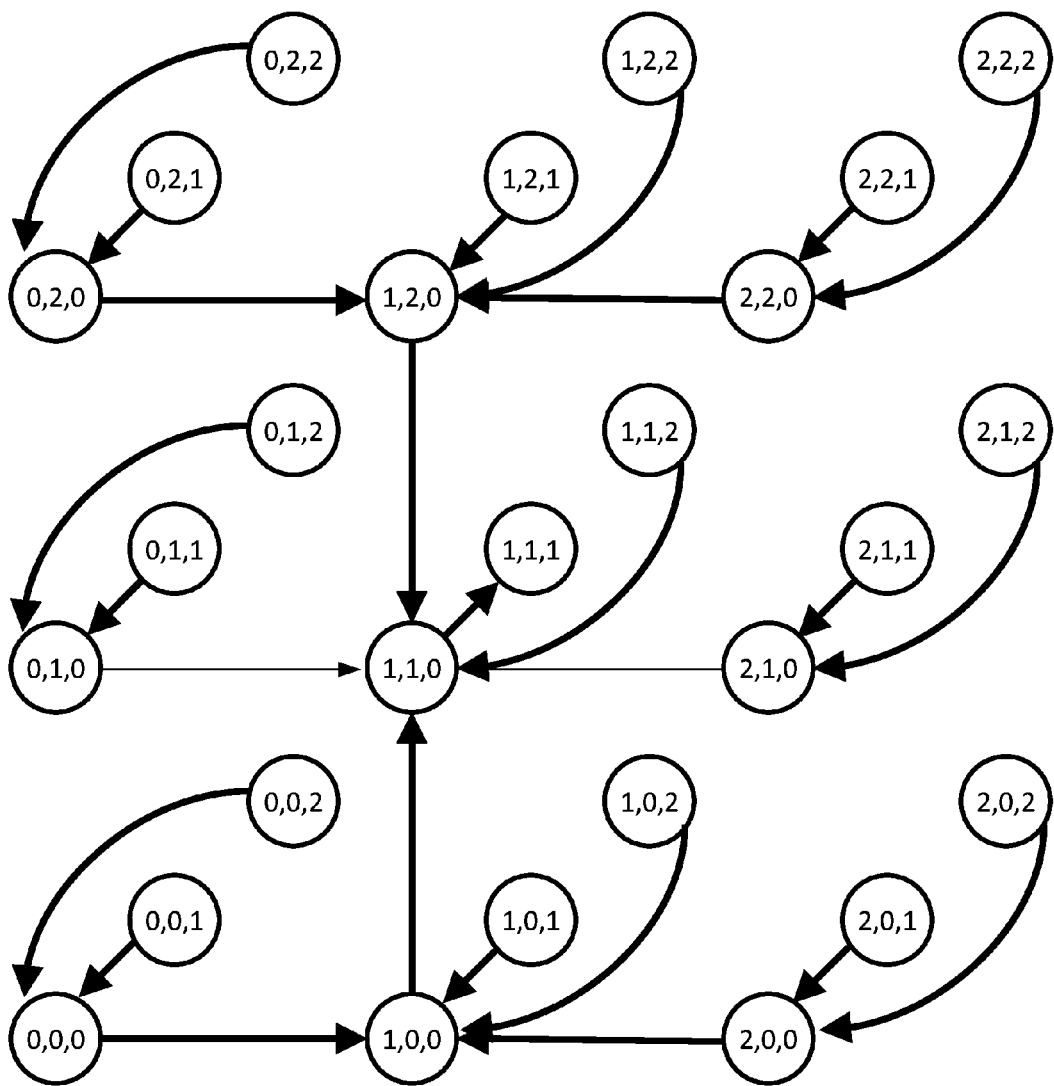
FIG. 20 is a schematic diagram of the network of FIG. 14 with a sixth aggregation tree defined over the network.

An example of a 3D, 3-ary network topology (also referred to as a torus) is given in FIG. 14. Again each note is represented by a circle containing its coordinate, this time in 3 dimensions. Each node has six point to point connections to other nodes. This topology may be extended for larger numbers of nodes in each dimension and it supports six, edge-independent aggregation trees. These are illustrated in FIGS. 15 to 20. The node with coordinates 1,1,1 is the root of each tree and in this example six aggregation trees are used per reduce task.

Figure 21:
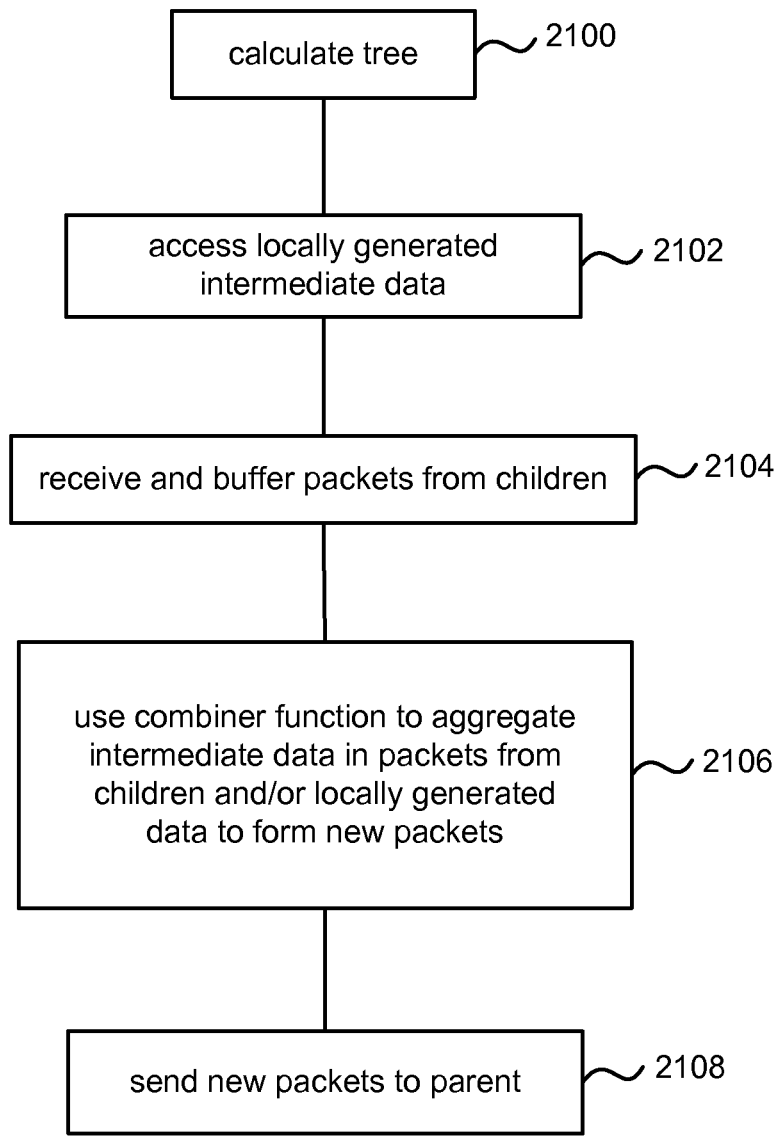
FIG. 21 is a flow diagram of a method of on-path aggregation.

Each node is aware of its child and parent nodes for each aggregation tree. This is achieved by constructing the trees in the co-ordinate space in such a manner that each node, based on its local co-ordinates, is able to derive its position in the tree. With reference to FIG. 21, each node calculates the aggregation tree(s) 2100. A computing entity accesses 2102 its locally generated intermediate data. It receives and buffers 2104 packets from child nodes of a particular aggregation tree. It uses 2106 a combiner function to aggregate intermediate data in the packets from those child nodes and/or locally generated intermediate data to form new packets. The new packets are then sent 2108 to a parent node of the particular aggregation tree.

In the case of a communications link failure the multi-hop component 810 may be co-ordinate aware. By routing packets to vertex coordinates link failures are accommodated. A vertex coordinate is a coordinate of a direct connect network node which is part of an aggregation tree.

Each computing entity in the network may have a recovery engine 818 arranged to trigger a recovery phase when a packet is received which indicates that another communications entity in the network has failed. For example, the recovery engine is arranged to contact a parent communications entity of the failed communications entity and request the last key received from the failed communications entity. The recovery engine may be arranged to instruct each child of the failed communications entity to resend packets on the basis of the last key received from the failed communications entity. This enables any packets lost at the failed node to be recovered.

In an example, server failures result in coordinates representing vertexes on a failed server being remapped to other servers by the co-ordinate space management component

806. Packets being routed to the vertex on the failed server will be delivered to another server responsible for the coordinate. All packets sent from a child to a parent have a local sequence number for that edge starting from zero. When a server receives a packet for a vertex it checks the sequence number. If the sequence number is not zero then the server assumes a failure has occurred causing the vertex to be remapped, and it triggers a recovery phase. First, the server contacts the parent vertex of the failed vertex and requests the last key that it received from the failed vertex. Next in the recovery process, each child of the failed vertex is instructed to re-send all the (key,value) pairs from the specified last key onwards. As keys are ordered this ensures that the aggregation function can proceed correctly. If the root of the tree fails then all (key,value) pairs need to be resent, and the new vertex simply requests each child to resend from the start.

In some cases, implementing this requires the retransmit request to be propagated down the tree to all leaves which have the original intermediate data, that are descendants of the failed vertex. In the cases where the root has not failed this is expensive, so as an optional optimization, each vertex keeps a copy of all packets sent in the last t milliseconds. Under normal operation, failure and remapping occurs within t ms, so a child of the vertex being recovered can send the pairs without needing to propagate the retransmission request.

In implementations where the intermediate data is not replicated, if the failed server stored intermediate data it will need to be regenerated. In that case a local recovery process that exploits the knowledge of where replicas of the original input data processed by the failed map task reside may be used to select the new server to run the map task. As the map function is deterministic, the sequence of keys generated is the same as the one generated by the failed server, so the map task does not resend (key,value) pairs before the last key known to have been incorporated. In an example, a method at a computing entity in a direct-connect network of computing entities provides a key-based distributed process comprising:

receiving a plurality of streams of packets at the computing entity, each stream being for forwarding to one of a plurality of reduce tasks of the key-based process located at other computing entities in the network, and where the packets have payloads of key-value pairs of the key-based process;

for each reduce task, forming a queue;

adding the received packets to the queues according to the reduce tasks and at positions in the queues according to keys in the payloads of the packets. For example, the method comprises selecting a packet for forwarding to a reduce task by taking a packet from a head of one of the queues according to a per-source sequence number of each packet.

Figure 22:
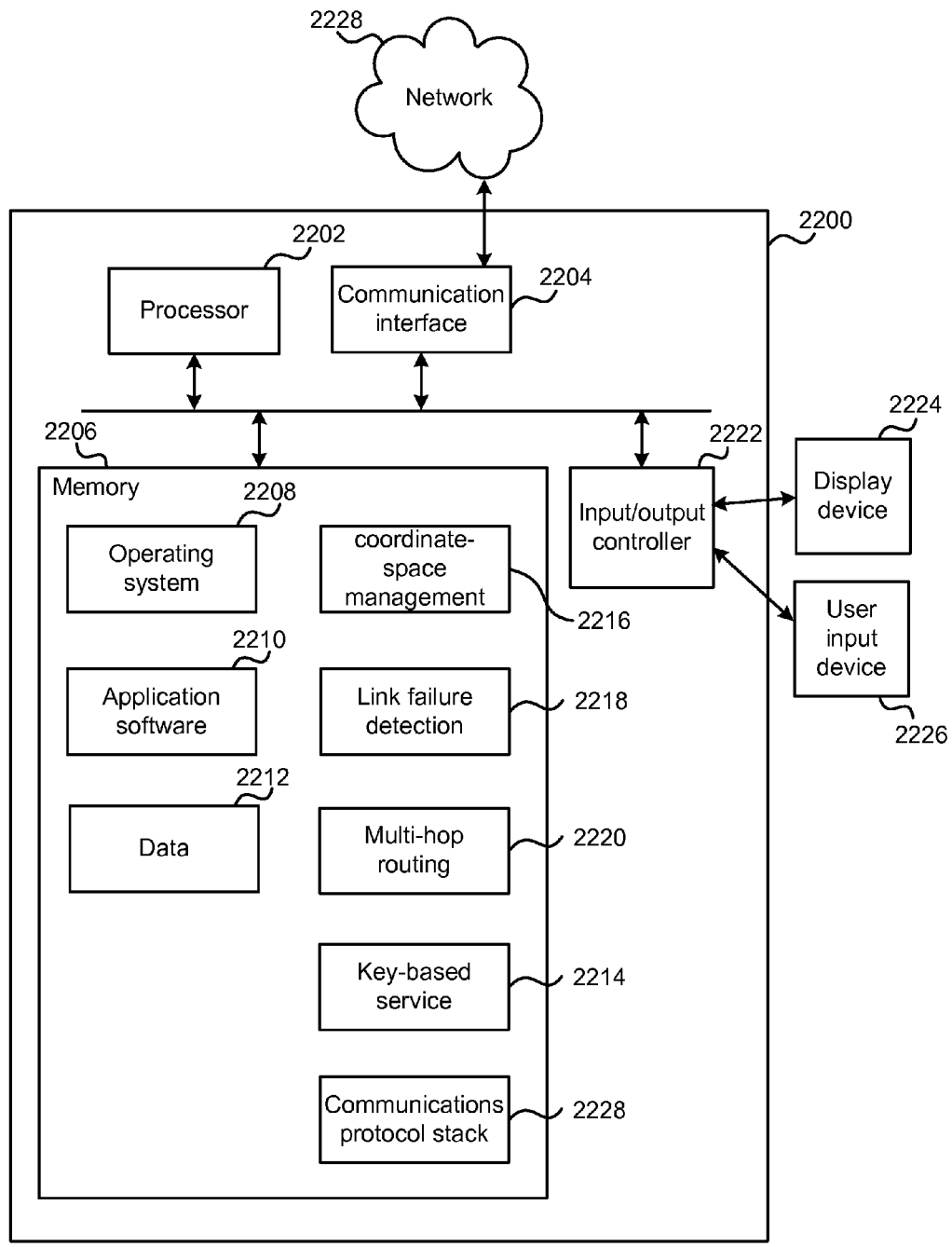
FIG. 22 illustrates an exemplary computing-based device in which embodiments of a computing entity for supporting a key-based process in a direct-connect topology network may be implemented.

FIG. 22 illustrates various components of an exemplary computing-based device 2200 which may be implemented as any form of a computing and/or electronic device, and in which embodiments of the methods described herein may be implemented.

The computing-based device 2200 is arranged to have a plurality of communications links to other entities in a network 2228. It may comprise communication interface 2204 for facilitating these communications links.

Computing-based device 2200 also comprises one or more processors 2202 which may be microprocessors, controllers or any other suitable type of processors for processing computing executable instructions to control the operation of the device in order to support key-based processes. In some examples, for example where a system on a chip architecture is used, the processors 2202 may include one or more fixed function blocks (also referred to as accelerators) which implement a part of any of the method described herein in hardware (rather than software or firmware). Platform software comprising an operating system 2208 or any other suitable platform software may be provided at the computing-based device to enable application software 2210 to be executed on the device. The memory 2006 may also store data 2212 such as a locally replicated part of an input data set, intermediate data of a key-based process or other data. A coordinate-space management component 2216 is provided which manages a unique coordinate of the computing device as part of a direct-connect network using a coordinate space management process shared on the direct-connect network. A link failure detection component 2218 is arranged to monitor direct connections between the computing device 2200 and other computing entities in a direct connect network and report any link failures. A multi-hop routing component 2220 is provided which implements a multi-hop routing protocol. A key-based service component 2214 provides a key-based process which is distributed over a direct connect network of entities of which the computing device 2200 is one. A communications protocol stack 2228 enables packet-based communications between the computing device 2200 and other entities.

The computer executable instructions may be provided using any computer-readable media that is accessible by computing based device 2200. Computer-readable media may include, for example, computer storage media such as memory 2206 and communications media. Computer storage media, such as memory 2206, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Although the computer storage media (memory 2206) is shown within the computing-based device 2200 it will be appreciated that the storage may be distributed or located remotely and accessed via a network or other communication link (e.g. using communication interface 2204).

The computing-based device 2200 may comprise an input/output controller 2222 arranged to output display information to a display device 2224 which may be separate from or integral to the computing-based device 2200. The display information may provide a graphical user interface. The input/output controller 2222 is also arranged to receive and process input from one or more devices, such as a user input device 2226 (e.g. a mouse or a keyboard). In an embodiment the display device 2224 may also act as the user input device 2226 if it is a touch sensitive display device. The input/output controller 2222 may also output data to devices other than the display device, e.g. a locally connected printing device.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible (or non-transitory) storage media include disks, thumb drives, memory etc and do not include propagated signals. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A method at a computing entity in a direct-connect network of computing entities which provides a key-based distributed process comprising:
   identifying a plurality of streams of packets being received at the computing entity for forwarding to a single reduce task of the key-based process at another entity in the network, those packets having payloads of intermediate data of the key-based distributed process;
   aggregating a plurality of the packets from the identified streams to form a single packet and forwarding the single packet to the single reduce task;
   wherein aggregating the plurality of packets comprises aggregating intermediate data of payloads of the plurality of packets using a combiner function of the key-based distributed process.

2. A method as claimed in claim 1 wherein identifying the plurality of streams of packets comprises identifying streams of packets received from communications entities which are children of the computing entity on an aggregation tree defined over the direct-connect network.

3. A method as claimed in claim 2 wherein forwarding the single packet to the single reduce task comprises forwarding the single packet to a parent of the communication entity on the aggregation tree.

4. A method as claimed in claim 1 which comprises:
   determining a plurality of aggregation trees of which the communications entity is a member, the plurality of aggregation trees being associated with a single reduce task of the key-based process, each aggregation tree comprising at least one child node directly connected to the communications entity and a parent node directly connected to the communications entity; and
   receiving packets from the child nodes and forwarding packets to the parent nodes according to reduce tasks associated with the packets.

5. A method as claimed in claim 4 wherein the plurality of aggregation trees for a single reduce task are edge-independent such that any point to point communications link between two communications entities in the network is not a member of two of the plurality of aggregation trees.

6. A method as claimed in claim 4 which comprises, for each aggregation tree, aggregating packets received from child nodes of that aggregation tree and forwarding aggregated packets to the parent node of that aggregation tree.

7. A method as claimed in claim 1 wherein the direct connect network is any of: a three dimensional torus, a two dimensional torus, a torus of higher dimension than two, a De Bruijn graph.

8. A method as claimed in claim 1 which comprises accessing a co-ordinate management service arranged to assign a co-ordinate to each computing entity in the network;
   detecting failure of a computing entity or communications link directly connected to the computing entity; and
   using the co-ordinate management service to adjust the assigned co-ordinates to take into account the detected failure.

9. A method at a computing entity in a direct-connect network of computing entities which provides a key-based distributed process comprising:
   receiving a plurality of streams of packets at the computing entity, each stream being for forwarding to one of a plurality of reduce tasks of the key-based process located at other computing entities in the network, and where the packets have payloads of key-value pairs of the key-based process;

for each reduce task, forming a queue;

adding the received packets to the queues according to the reduce tasks and at positions in the queues according to keys in the payloads of the packets.

10. A method as claimed in claim 9 comprising selecting a packet for forwarding to a reduce task by taking a packet from a head of one of the queues according to a per-source sequence number of each packet.

11. A method as claimed in claim 9 wherein each packet comprises a payload of key-value pairs which are in key-based order.

12. A method as claimed in claim 9 wherein the direct connect network is any of: a three dimensional torus, a two dimensional torus, a torus of higher dimension than two, a De Bruijn graph.

13. A computing entity in a direct-connect network of computing entities, the computing entity comprising:

one or more processors configured to provide a key-based distributed process comprising:

for each of a plurality of aggregation trees defined over the network of computing entities:

an identifier arranged to identify a plurality of streams of packets being received at the computing entity for forwarding to a single reduce task of the key-based process at another entity in the network, which is the same reduce task for each identified stream, those packets having payloads of intermediate data of the key-based distributed process; and an aggregator arranged to aggregate a plurality of the packets from the identified streams to form a single packet and forward the single packet to a parent computing entity of the aggregation tree;

the aggregator being arranged to aggregate intermediate data of payloads of the plurality of packets using a combiner function of the key-based distributed process.

14. A computing entity as claimed in claim 13 wherein the identifier is arranged to identify the plurality of streams by detecting packets received from child computing entities of the aggregation tree.

15. A computing entity as claimed in claim 13 wherein the plurality of aggregation trees are for a single reduce task and are edge-independent such that any point to point communications link between two communications entities in the network is not a member of two of the plurality of aggregation trees.

16. A computing entity as claimed in claim 13 wherein the direct connect network is any of: a three dimensional torus, a two dimensional torus, a torus of higher dimension than two, a De Bruijn graph.

17. A computing entity as claimed in claim 13 comprising a recovery engine arranged to trigger a recovery phase when a packet is received which indicates that another communications entity in the network has failed, the recovery engine being arranged to contact a parent communications entity of the failed communications entity and request a last key received from the failed communications entity.

18. A computing entity as claimed in claim 17 wherein the recovery engine is arranged to instruct each child of the failed communications entity to resend packets on the basis of the last key received from the failed communications entity.

19. A direct connect topology network of computing entities connected to one another using point to point communications links wherein each computing entity is as claimed in claim 13.

20. A direct connect topology network of computing entities connected to one another using point to point communications links wherein each computing entity is as claimed in claim 13 and the network has a 3D torus topology.

* * * * *